United States Patent
Kim et al.

(10) Patent No.: US 9,791,920 B2
(45) Date of Patent: Oct. 17, 2017

(54) APPARATUS AND METHOD FOR PROVIDING CONTROL SERVICE USING HEAD TRACKING TECHNOLOGY IN ELECTRONIC DEVICE

(71) Applicant: Samsung Electronics Co., Ltd., Suwon-si, Gyeonggi-do (KR)

(72) Inventors: Seon-Hwa Kim, Seoul (KR); Kyung-Hwa Kim, Seoul (KR); Hong-Il Kim, Suwon-si (KR); Mi-Jung Park, Hwaseong-si (KR); Seock-Hyun Yu, Seoul (KR); Jo-Ah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/147,839

(22) Filed: Jan. 6, 2014

(65) Prior Publication Data

US 2014/0191948 A1  Jul. 10, 2014

(30) Foreign Application Priority Data

Jan. 4, 2013 (KR) ......................... 10-2013-0001102

(51) Int. Cl.
*G06F 3/01* (2006.01)
*G06F 3/0483* (2013.01)
(Continued)

(52) U.S. Cl.
CPC .............. *G06F 3/012* (2013.01); *G06F 3/013* (2013.01); *G06F 3/0481* (2013.01);
(Continued)

(58) Field of Classification Search
CPC ........ G06F 3/012; G06F 3/013; G06F 3/0485; G06F 3/0483; G06F 3/0484; G06T 7/20; H04N 5/4403; H04N 21/4223; H04N 21/478; H04N 21/47217; H04N 21/44218; H04N 21/44008; H04N 21/41407; H04N 21/431; H04M 1/0264
See application file for complete search history.

(56) References Cited

U.S. PATENT DOCUMENTS 7,889,244 B2 * 2/2011 Tsukizawa et al. ........ 348/222.1
2009/0271734 A1  10/2009 Hsu et al.
(Continued)

FOREIGN PATENT DOCUMENTS

CN  101326546 A  12/2008
CN  102342100 A   2/2012
(Continued)

OTHER PUBLICATIONS

Yoon et al., "Detection of Partially Occluded Face using Support Vector Machines", IAPR Workshop on Machine Vision Applications, Dec. 11-13, 2002, pp. 546-549, Nara, Japan.
(Continued)

*Primary Examiner* — Andrew Sasinowski
(74) *Attorney, Agent, or Firm* — Jefferson IP Law, LLP

(57) ABSTRACT

An apparatus and a method for controlling an electronic device using head tracking technology are provided. The method includes detecting face motion from an image captured through a camera of the electronic device and executing a control service corresponding to the detected face motion information.

20 Claims, 21 Drawing Sheets

(51) Int. Cl.

| | | |
|---|---|---|
| H04M 1/02 | (2006.01) | |
| G06F 3/0485 | (2013.01) | |
| G06T 7/20 | (2017.01) | |
| H04N 5/44 | (2011.01) | |
| G06F 3/0481 | (2013.01) | |
| G06F 3/0484 | (2013.01) | |
| H04N 21/414 | (2011.01) | |
| H04N 21/4223 | (2011.01) | |
| H04N 21/431 | (2011.01) | |
| H04N 21/44 | (2011.01) | |
| H04N 21/442 | (2011.01) | |
| H04N 21/478 | (2011.01) | |
| H04N 21/4415 | (2011.01) | |
| H04N 21/454 | (2011.01) | |
| H04N 21/472 | (2011.01) | |
| H04N 21/4782 | (2011.01) | |

(52) U.S. Cl.
CPC .......... *G06F 3/0483* (2013.01); *G06F 3/0484* (2013.01); *G06F 3/0485* (2013.01); *G06T 7/20* (2013.01); *H04M 1/0264* (2013.01); *H04N 5/4403* (2013.01); *H04N 21/41407* (2013.01); *H04N 21/4223* (2013.01); *H04N 21/431* (2013.01); *H04N 21/44008* (2013.01); *H04N 21/44218* (2013.01); *H04N 21/478* (2013.01); *H04N 21/47217* (2013.01); *H04N 21/4415* (2013.01); *H04N 21/454* (2013.01); *H04N 21/4782* (2013.01); *H04N 21/47214* (2013.01)

(56) References Cited

U.S. PATENT DOCUMENTS

| | | | | |
|---|---|---|---|---|
| 2009/0273687 | A1* | 11/2009 | Tsukizawa | G06F 3/012 348/222.1 |
| 2010/0054518 | A1 | 3/2010 | Goldin | |
| 2010/0125816 | A1 | 5/2010 | Bezos | |
| 2010/0225735 | A1* | 9/2010 | Shaffer et al. | 348/14.08 |
| 2012/0064951 | A1* | 3/2012 | Agevik et al. | 455/569.1 |
| 2012/0256967 | A1* | 10/2012 | Baldwin et al. | 345/684 |
| 2012/0290401 | A1 | 11/2012 | Neven | |
| 2013/0135198 | A1* | 5/2013 | Hodge | G06F 3/013 345/156 |

FOREIGN PATENT DOCUMENTS

| | | |
|---|---|---|
| EP | 2 333 640 A1 | 6/2011 |
| GB | 2 490 865 A | 11/2012 |

OTHER PUBLICATIONS

Liu et al., "The Full Motorcycle Helmet Detection Scheme Using Canny Detection", 18th IPPR Conference on Computer Vision, Graphics and Image Processing (CVGIP), 2005, pp. 1104-1110.

Wu et al., "Recognition and warning of sunglasses in Bank Monitoring System", Kunming, Yunnan University, 2009.

Crisman et al., "SCARF: A Color Vision System that Tracks Roads and Intersections", Chrisman and Thorpe: Color Vision System that Tracks Roads and Intersections, Feb. 1993, pp. 49-58, vol. 9, No. 1.

Lin et al., "Face Occlusion Detection for Automated Teller Machine Surveillance", Advances in Image and Video Technology, 2006, pp. 641-651.

Yuan, "Abnormal Human Face Location and Recognition", Nanjing: Nanjing University of Science and Technology, 2005.

Kim et al., "Face Occlusion Detection by using B-spline Active Contour and Skin Color Information", 2010 11th Int. Conf. Control, Automation, Robotics and Vision, Dec. 5-8, 2010, pp. 627-632, Singapore.

Wen et al., "The Safety Helmet Detection for ATM's Surveillance System via the Modified Hough Transform", Security Technology IEEE 37th Annual 2003 International Carnahan Conference, 2003, pp. 364-369.

Wu et al., "Glasses Detection by Boosting Simple Wavelet Features", Pattern Recognition, 2004. ICPR 2004. Proceedings of the 17th International Conference on. IEEE, 2004, pp. 1-4.

Chen et al., "Modification of the Ada Boost-based Detector for Partially Occluded Faces", Pattern Recognition, 2006. ICPR 2006. 18th International Conference on. IEEE, 2006, pp. 516-519, Beijing, China.

Kurita et al., "Recognition and Detection of Occluded Faces by a Neural Network Classifier with Recursive Data Reconstruction", Proceedings. IEEE Conference on Advanced Video and Signal Based Surveillance, 2003, pp. 53-58.

Choi et al., "Facial Fraud Discrimination Using Detection and Classification", Advances in Visual Computing, 2010, pp. 199-208.

Kim et al., "A New Video Surveillance System Employing Occluded Face Detection", Innovations in Applied Artificial Intelligence, 2005, Innovations in Applied Artificial Intelligence, 2005, pp. 103-104.

Hotta, "A Robust Face Detector Under Partial Occlusion", ResearchGate, Systems and Computers in Japan, 2007, pp. 39-48.

Martinez, "Reconition of Partially Occluded and/or Imprecisely Localized Faces Using a Probalistic Approach", Proceedings of IEEE Computer Vision and Pattern Recognition, 2000, pp. 712-717.

Li et al., "Study on Face Classification Methods Based on Facial Features", Microcomputer Applications, 2010, pp. 1-61.

Goldmann, "Components and Their Topology for Robust Face Detection in the Presence of Partial Occlusions", IEEE Transactions of Information Forensics and Security, Sep. 2007, pp. 559-569, vol. 2, No. 3.

Goldmann et al., "On the Detection and Localization of Facial Occlusions and its Use within Difference Scenarios", Multimedia Signal Processing, 2008 IEEE 10th Workshop on. IEEE, 2008, pp. 592-597.

Eum et al., "Face Recognizability Evaluation for ATM Applications with Exceptional Occlusion Handling", IEEE computer Society Conference on Computer Vision and Pattern Recognition Workshops, 2011, pp. 82-89.

Viola et al., "Rapid Object Detection using a Boosted Cascade of Simple Features", Accepted Conference on Computer Vision and Pattern Recognition, IEEE Conference on Computer Vision and Pattern Recognition, 2001, pp. 511-518.

Viola et al., "Robust Real-Time Face Detection" International Journal of Computer Vision, International journal of computer vision, 2004, pp. 137-154.

Zou et al., "Real-time Elliptical Head Contour Detection Under Arbitrary Pose and Wide Distance Range", Institute of Automation, 2009, pp. 217-228, Beijing, China.

Ekenel et al., "Why is Facial Occlusion a Challenging Problem?", Advances in Biometrics, 2009, pp. 299-308.

Martinez et al., "The AR Face Database", Computer Vision Center, Jun. 1998.

Joshi et al., "A Survey on Moving Object Detection and Tracking in Video Surveillance System", International Journal of Soft Computing and Engineering (IJSCE), Jul. 2012, pp. 1-5, vol. 2, issue 3.

Wan et al., "The Methods for Moving Object Detection", Computer Simulation, 2006, pp. 221-226.

* cited by examiner

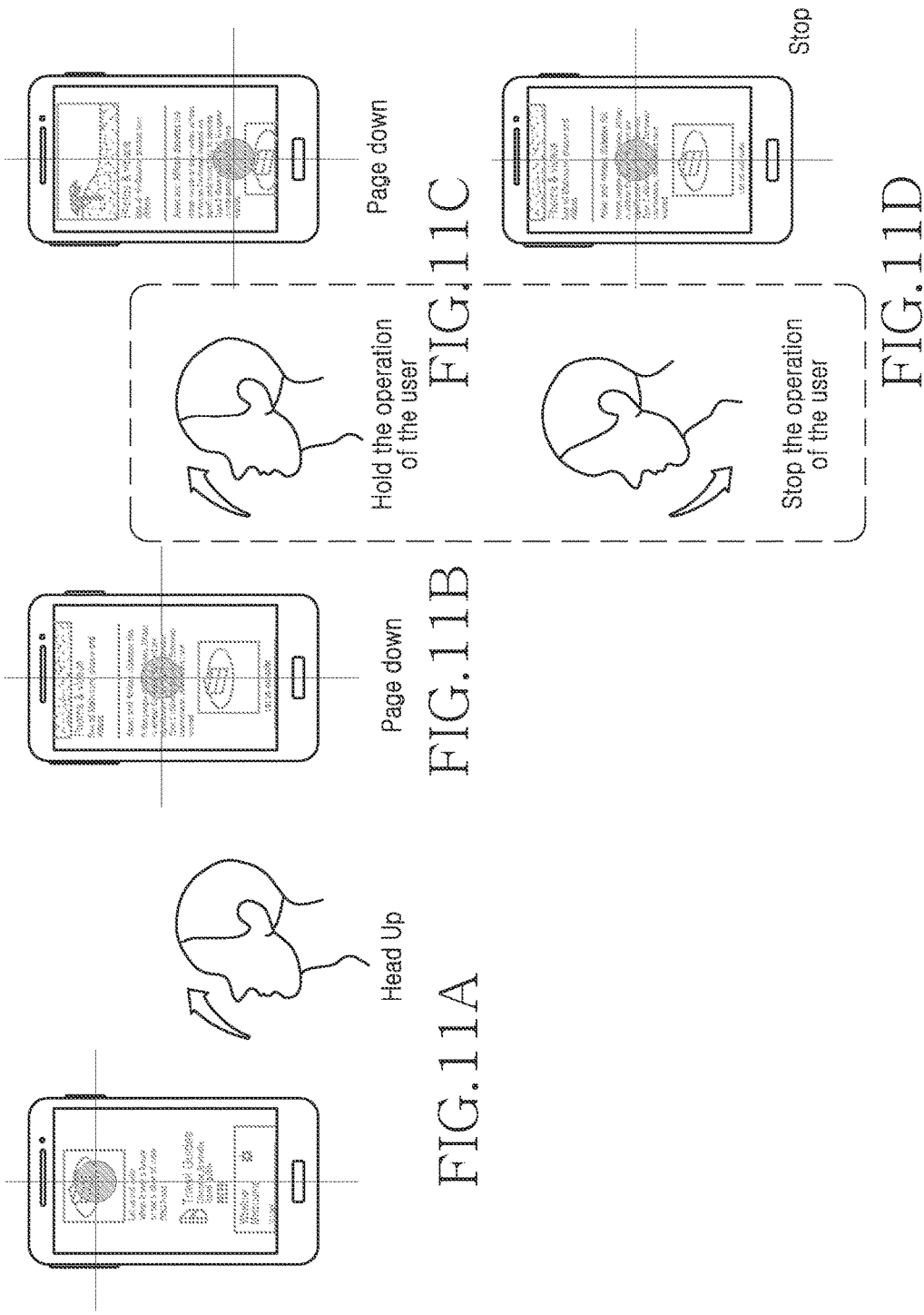

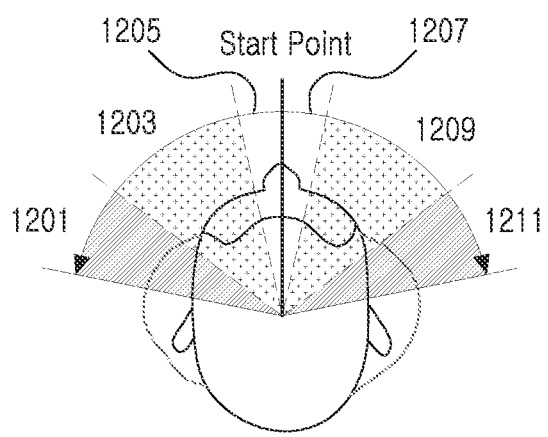
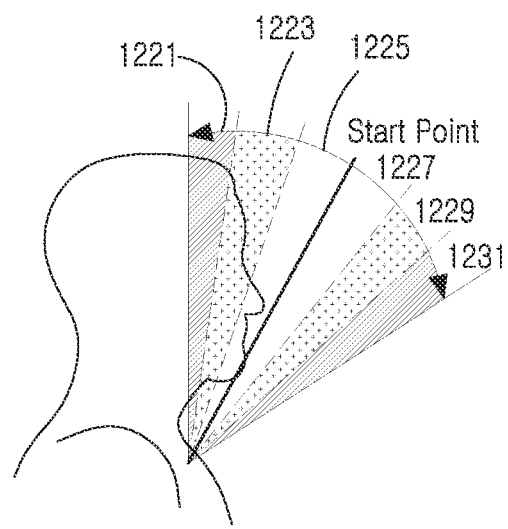
Left and right direction
FIG.12A
Forward and backward direction
FIG.12B
☐ Nomovement
▨ Normal Speed
▧ Fast Speed

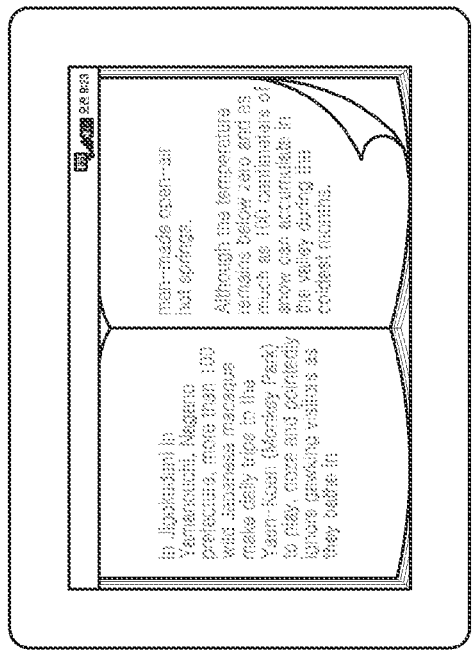
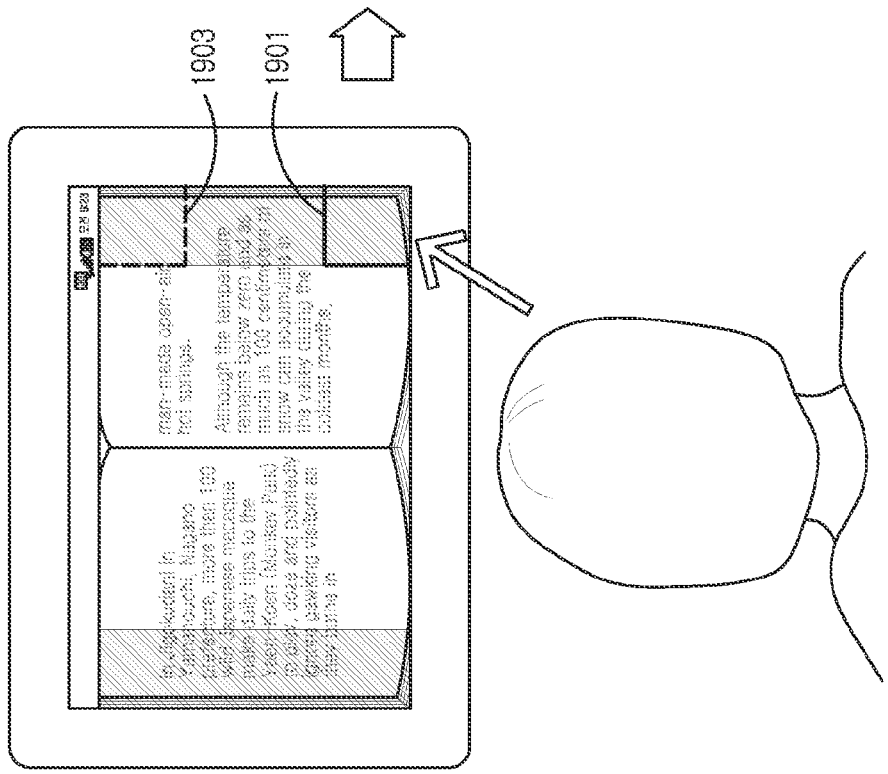
FIG.19A
FIG.19B

APPARATUS AND METHOD FOR PROVIDING CONTROL SERVICE USING HEAD TRACKING TECHNOLOGY IN ELECTRONIC DEVICE

CROSS-REFERENCE TO RELATED APPLICATION(S)

This application claims the benefit under 35 U.S.C. §119(a) of a Korean patent application filed on Jan. 4, 2013 in the Korean Intellectual Property Office and assigned Serial number 10-2013-0001102, the entire disclosure of which is hereby incorporated by reference.

TECHNICAL FIELD

The present disclosure relates to an apparatus and method for controlling an electronic device.

BACKGROUND

Portable electronic devices have been developed into multimedia devices. The portable electronic devices provide various multimedia services using a data communication service as well as a voice call service according to development of information and communication technologies and semiconductor technologies. For example, each of the portable electronic devices may provide various multimedia services such as a broadcasting service, a wireless Internet service, a camera service, a music play service, and the like.

Each of the portable electronic devices uses a touch screen which is one input and output device which performs input and display of information to improve a space utilization degree and increase a size of a display unit of the portable electronic device.

According to the related art, a user of the portable electronic device must use the user's hand or a touch pen (e.g., a stylus) to operate the portable electronic device. For example, when the user of the portable electronic device uses a call service, the user touches buttons of a keypad displayed on the touch screen and inputs a telephone number. The user of the portable electronic device may touch a call icon and attempt to connect a call.

However, when the user of the portable electronic device has medical problems, there is a problem in that the user may not easily operate the portable electronic device. In other words, functionality of the portable electronic device may be inaccessible to various users as a result of the limited means for operating the portable electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for providing a control service based on face motion information of a user in an electronic device.

Another aspect of the present disclosure is to provide an apparatus and method for providing a control service based on face motion information of a user without touch interaction in an electronic device having a touch screen.

Another aspect of the present disclosure is to provide an apparatus and method for controlling video play based on face motion information of a user in an electronic device.

Another aspect of the present disclosure is to provide an apparatus and method for controlling video play based on face motion information and pupil motion information in an electronic device.

Another aspect of the present disclosure is to provide an apparatus and method for scrolling a screen based on face motion information of a user in an electronic device.

Another aspect of the present disclosure is to provide an apparatus and method for panning a screen based on face motion information of a user in an electronic device.

Another aspect of the present disclosure is to provide an apparatus and method for providing a call receiving service based on face motion information of a user in an electronic device.

Another aspect of the present disclosure is to provide an apparatus and method for providing an e-book service based on face motion information of a user in an electronic device.

Another aspect of the present disclosure is to provide an apparatus and method for controlling a screen inactivation mode based on face motion information of a user in an electronic device.

Another aspect of the present disclosure is to provide an apparatus and method for controlling a screen inactivation mode based on face motion information and pupil motion information of a user in an electronic device.

In accordance with an aspect of the present disclosure, a method of providing a control service in an electronic device is provided. The method includes detecting face motion from an image captured through a camera of the electronic device and executing a control service corresponding to the detected face motion information.

In accordance with another aspect of the present disclosure, an electronic device is provided. The electronic device includes at least one camera, a display unit, and at least one processor, wherein at least the one processor is configured to detect face motion from an image captured through at least the one camera of the electronic device, and to execute a control service corresponding to the detected face motion information.

A non-transitory computer-readable storage medium storing instructions that, when executed, cause at least one processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 11A, 11B, 11C, and 11D illustrate screens for scrolling a screen based on face motion information in an electronic device according to an embodiment of the present disclosure;

FIGS. 12A and 12B illustrate face motion of a user for determining a scroll variable according to an embodiment of the present disclosure;

FIGS. 19A and 19B illustrate screens for controlling an e-book service based on face motion information in an electronic device according to an embodiment of the present disclosure;

Throughout the drawings, it should be noted that like reference numbers are used to depict the same or similar elements, features, and structures

DETAILED DESCRIPTION

Figure 1:
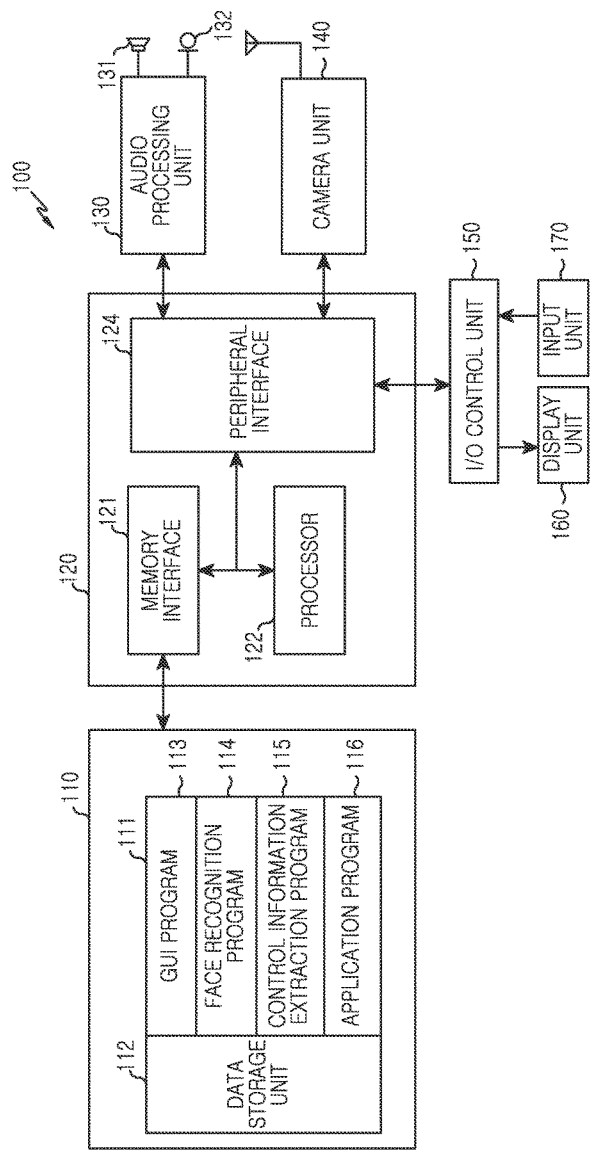
FIG. 1 is a block diagram illustrating configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

More particularly, the present disclosure relates to an apparatus and method for controlling an electronic device using a head tracking technology.

Hereinafter, a description will be given for an apparatus and method for providing a control service based on face motion information in an electronic device according to various embodiments of the present disclosure.

According to various embodiments of the present disclosure, the electronic device are assumed to estimate face motion of a user using a head tracking technology.

According to various embodiments of the present disclosure, an electronic device may include communication functionality. For example, an electronic device may be any one of a mobile communication terminal, a smart phone, a video phone, a Personal Digital Assistant (PDA), a Personal Computer (PC), a laptop computer, a smart phone, a netbook PC, an e-book reader, a Portable Multimedia Player (PMP), a TeleVision (TV), a Mobile Internet Device (MID), an Ultra Mobile PC (UMPC), a tablet PC, a navigation device, and a Moving Picture Experts Group (MPEG) layer 3 (MP3) player, a mobile medical device, a camera, a wearable device (e.g., a head-mounted device ("HMD"), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (e.g., a smart TV), a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a block diagram illustrating configuration of an electronic device according to an embodiment of the present disclosure.

Referring to FIG. 1, the electronic device denoted by 100 may include a memory 110, a processor unit 120, an audio processing unit 130, a camera unit 140, an Input/Output (I/O) controller 150, a display unit 160, and an input device 170. According to various embodiments of the present disclosure, the memory 110 may be a plurality of memories.

The memory 110 includes a program storing unit 111 for storing programs for controlling operations of the electronic device 100 and a data storing unit 112 for storing data generated while the programs are executed.

The data storing unit 112 stores a control function matched to face motion information of a user. The face motion information may include at least one of a face motion distance, a face direction, a face motion speed, a face motion angle, a face motion time, an age through face recognition, user authentication information, and the like.

The program storing unit 111 includes a Graphic User Interface (GUI) program 113, a face recognition program 114, a control information extraction program 115, at least one application program 116, and/or the like. The programs included in the program storing unit 111 may be expressed in an instruction set as a set of instructions.

The GUI program 113 includes at least one software component for providing a User Interface (UI) as graphics on the display unit 160. For example, the GUI program 113 may control the display unit 160 to display information about an application program executed by the processor 122.

The face recognition program 114 includes at least one software component for extracting face motion from an image of the user, which is captured through the camera unit 140. For example, the face recognition program 114 may estimate positions of eyes of the user from a face image of the user, which is captured through the camera unit 140. Thereafter, the face recognition program 114 may estimate face motion of the user based on a change in the positions of the eyes of the user. As another example, the face recognition program 114 may extract at least one feature point from a face image of the user, which is captured through the camera unit 140. Thereafter, the face recognition program 114 may estimate face motion of the user based on a change of at least one feature point included in the face image.

Figure 5A:
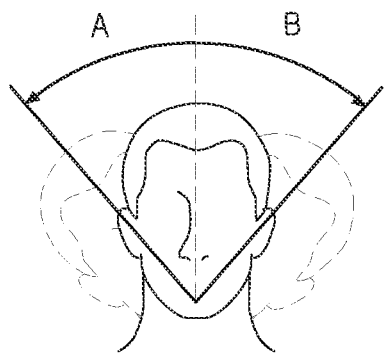
FIGS. 5A, 5B. 5C, and 5D illustrate face motion of a user needed to provide a control service in an electronic device according to an embodiment of the present disclosure.
Figure 5B:
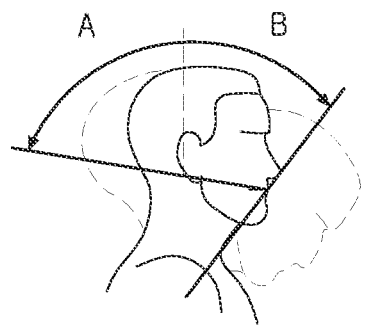

FIGS. 5A, 5B. 5C, and 5D illustrate face motion of a user needed to provide a control service in an electronic device according to an embodiment of the present disclosure.

Figure 5C:
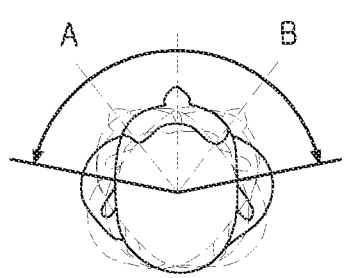
Figure 5D:
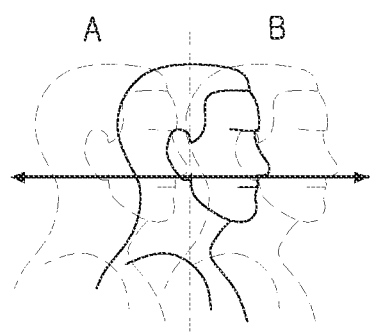

Referring to FIG. 5A, a face motion from side-to-side (e.g., a user shaking the user's head) may be detected. Referring to FIG. 5B, a face motion from front-to-back or up-to-down (e.g., a user nodding the user's head) may be detected. Referring to FIG. 5C, a change in a user's face direction may be detected. Referring to FIG. 5D, a distance of a user's face (e.g. a face moving forward and backward relative to a predetermined position such as a screen or camera of the electronic device) may be detected.

According to various embodiments of the present disclosure, the face motion may include one or more of an operation, illustrated in FIG. 5A, for moving a face center left and right, an operation, illustrated in FIG. 5B, for moving a face center forward and backward, an operation, illustrated in FIG. 5C, for changing a face direction left and right, and an operation, illustrated in FIG. 5D, for moving a face forward and backward.

According to various embodiments of the present disclosure, when only a part of the face of the user may be captured through the camera unit 140, the face recognition program 114 may estimate the entire face image using only the part of the face. For example, the face recognition program 114 may estimate the entire face image by comparing another face image of the user, which is stored in the data storing unit 112, with a partial image of the face of the user, which is captured through the camera unit 140. As another example, the face recognition program 114 may estimate the entire face image based on a face shape or and size detected from a partial image of the face of the user, which is captured through the camera unit 140.

According to various embodiments of the present disclosure, the face recognition program 114 may also estimate user authentication or an age group of the user through face recognition for an image captured through the camera unit 180. For example, the face recognition program 114 may extract a face region using information such as brightness, motion, colors, and eye positions for an image captured through the camera unit 140 and detect feature points of a face, such as eyes, a nose, a mouth, and/or the like included in the face region. Thereafter, the face recognition program 114 may estimate the user authentication or the age group of the user by comparing positions and sizes of feature points included in the image and a distance between the feature points with reference image information stored in the data storing unit 112.

The control information extraction program 115 includes at least one software component for extracting control information according to face motion information recognized through the face recognition program 114. According to various embodiments of the present disclosure, the control information extraction program 115 may extract face motion information recognized through the face recognition program 114 and control information corresponding to a type of a service provided from the processor 122 among at least one control information stored in the data storing unit 112. For example, when the processor 122 provides a video play service and face motion recognized through the face recognition program 114 moves out of a reference range, the control information extraction program 115 may extract pause control information from the data storing unit 112. If a plurality of faces is recognized through the face recognition program 114, the control information extraction program 115 may extract control information based on motion information about at least one reference face among the plurality of faces. The control information extraction program 115 may consider pupil motion information of the user together when extracting the control information.

According to various embodiments of the present disclosure, when the processor 122 provides an e-book service or an Internet service and the user recognized through the face recognition program 114 gazes at a reference region, the control information extraction program 115 may extract screen scroll control information according to a position of the gaze of the user from the data storing unit 112. The control information extraction program 115 may also determine a control variable for screen scroll based on at least one of an age group, a face motion speed, a face motion angle, a face motion distance, and a face motion time of the user. According to various embodiments of the present disclosure, the variable for the screen scroll may include at least one of a scroll speed and display magnification of a screen in scrolling.

According to various embodiments of the present disclosure, the control information extraction program 115 may extract control information for panning a screen displayed on the display unit 160 from the data storing unit 112 according to a face direction recognized through the face recognition program 114.

According to various embodiments of the present disclosure, when the processor 122 provides a call service, the control information extraction program 115 may extract call reception control information according to a face direction recognized through the face recognition program 114 from the data storing unit 112. The control information extraction program 115 may also determine a call receiving method based on at least one of a face motion speed, a face motion angle, a face motion distance, and a face motion time. The call receiving method may include one or more of call receiving acceptance, voice mail box connection, and call receiving rejection.

According to various embodiments of the present disclosure, when the processor 122 provides an e-book service, the control information extraction program 115 may extract control information such as bookmark setting information or page change information from the data storing unit 112 according to face motion information recognized through the face recognition program 114.

According to various embodiments of the present disclosure, when face motion recognized through the face recognition program 114 does not get out of a reference range, the control information extraction program 115 may extract screen holding control information from the data storing unit 112. If a plurality of faces is recognized through the face recognition program 114, the control information extraction program 115 may extract control information based on motion information about at least one reference face among the plurality of faces. The control information extraction program 115 may also consider pupil motion information of the user together when extracting the control information.

The application program 116 includes a software component for at least one application program installed in the electronic device 100.

The processor unit 120 includes a memory interface 121, at least one processor 122, and a peripheral interface 124.

According to various embodiments of the present disclosure, the memory interface 121, at least the one processor 122, and the peripheral interface 124 which are included in the processor unit 120 may be integrated in at least one Integrated Circuit (IC) or be separately implemented.

The memory interface 121 controls that a component like the processor 122 or the peripheral interface 124 accesses the memory 110.

The peripheral interface 124 controls connection among an I/O peripheral of the electronic device 100, the processor 122, and the memory interface 121.

The processor 122 provides a variety of multimedia services using at least one software program. In addition, the processor 122 executes at least one program stored in the memory 110 and provides a service according to the corresponding program. For example, the processor 122 may execute the control information extraction program 115 stored in the program storing unit 111 and execute a control service corresponding to face motion information.

The audio processing unit 130 provides an audio interface between the user and the electronic device 100 through a speaker 131 and a microphone 132.

According to various embodiments of the present disclosure, camera unit 140 is located on a front surface of the electronic device 100 and provides collection images to the processor unit 120 by photographing an object. For example, the camera unit 140 may include a camera sensor for converting an optical signal into an electric signal, an image processing device for converting an analog image signal into a digital image signal, and a signal processing device for processing images to display an image signal outputted from the image processing device on the display unit 160. The camera sensor may be any one of a Charge Coupled Device (CCD) sensor or Complementary Metal-Oxide Semiconductor (CMOS) sensor, and the like. The signal processing device may be a Digital Signal Processor (DSP). According to various embodiments of the present disclosure, the camera unit 140 may be located on another surface of the electronic device 100.

The I/O controller 150 provides an interface between I/O devices, including the display device 160 and the input device 170, and the peripheral interface 124.

The display unit 160 displays state information of the electronic device 100, characters input by the user, moving pictures, still pictures, and the like. For example, the display unit 160 may display information about an application program executed by the processor 122.

The input device 170 provides input data generated by selection of the user to the processor unit 120 through the I/O controller 150. The input device 170 includes a keypad including at least one hardware button, a touch pad for detecting touch information, and the like. For example, the input device 170 may provide touch information detected through the touch pad to the processor 122 through the I/O controller 150.

In addition, according to various embodiments of the present disclosure, the electronic device 100 may include a camera which is located on a rear surface of the electronic device 100 and a communication system for performing a communication function for voice and data communication.

According to various embodiments of the present disclosure, the communication system may include a plurality of communication sub-modules which support different communication networks. For example, the communication network may be, but is not limited to, any one of a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, a Near Field Communication (NFC) network, and/or the like.

According to various embodiments of the present disclosure, the processor 122 may execute software components stored in the memory 110 in one module and execute a control service corresponding to face motion information.

Figure 2:
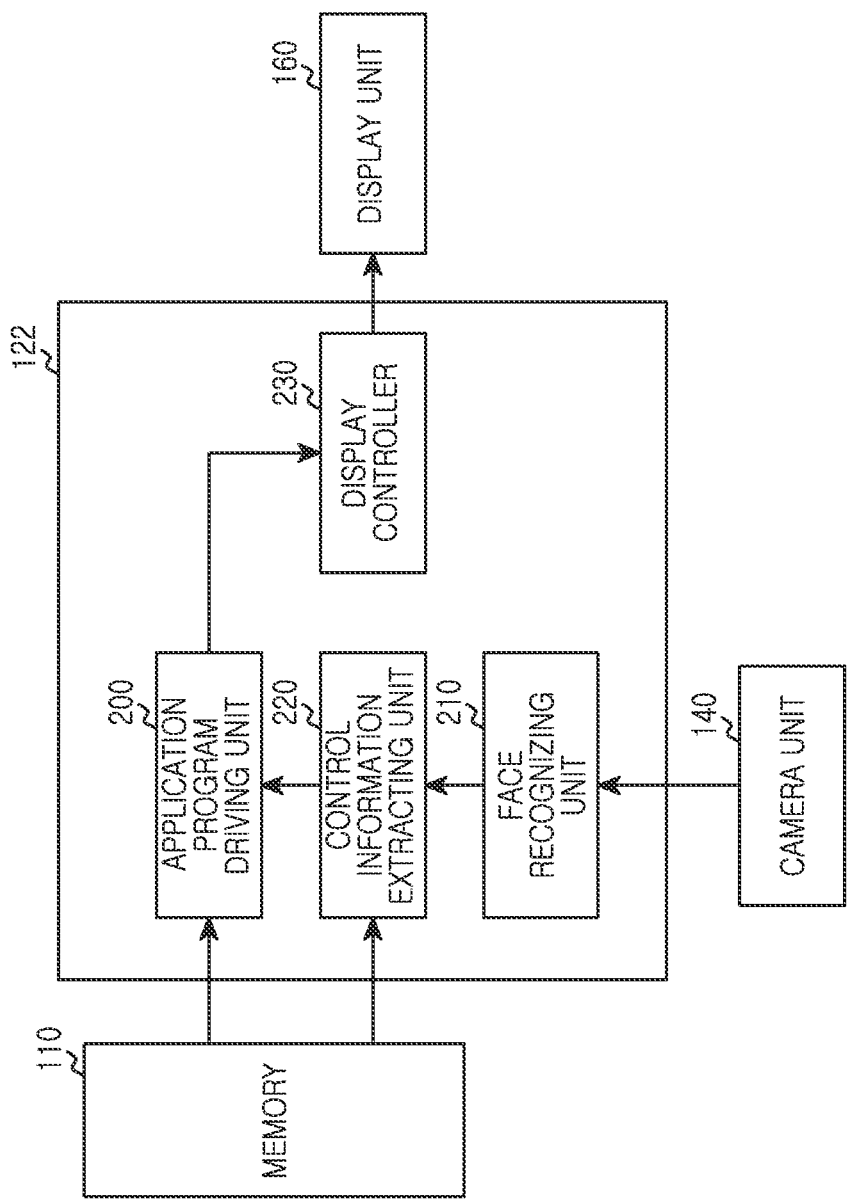
FIG. 2 is a block diagram illustrating detailed configuration of a processor according to an embodiment of the present disclosure.

According to various embodiments of the present disclosure, as illustrated in FIG. 2, the processor 122 may include components, for executing a control service corresponding to face motion information, as separate modules.

FIG. 2 is a block diagram illustrating detailed configuration of a processor according to an embodiment of the present disclosure.

Referring to FIGS. 1 and 2, the processor 122 includes an application program driving unit 200, a face recognizing unit 210, a control information extracting unit 220, and a display controller 230.

According to various embodiments of the present disclosure, the application program driving unit 200 executes at least one application program 116 stored in the program storing unit 111 and provides a service according to the corresponding application program. For example, the application program driving unit 200 may execute an application program stored in the program storing unit 111 and reproduce a video. As another example, the application program driving unit 200 may execute an application program stored in the program storing unit 111 and provide an e-book service. As another example, the application program driving unit 200 may execute an application program stored in the program storing unit 111 and provide a call receiving service. As another example, the application program driving unit 200 may execute an application program stored in the program storing unit 111 and provide an Internet service.

According to various embodiments of the present disclosure, the face recognizing unit 210 executes the face recognition program 114 stored in the program storing unit 111 and extracts face motion from an image of a user, which is captured through the camera unit 140. For example, the face recognizing unit 210 may estimate positions of eyes of the user from a face image of the user, which is captured through the camera unit 140. Thereafter, the face recognizing unit 210 may estimate face motion of the user based on a change in the positions of the eyes of the user. As another example, the face recognizing unit 210 may extract at least one feature point from a face image of the user, which is captured through the camera unit 140. Thereafter, the face recognizing unit 210 may estimate face motion of the user based on a change of at least one feature point included in the face image.

According to various embodiments of the present disclosure, when only a part of the face of the user may be captured through the camera unit 140, the face recognizing unit 210 may estimate the entire face image using only the part of the face. For example, the face recognizing unit 210 may estimate the entire face image by comparing another face image of the user, which is stored in the data storing unit 112, with a partial image of the face of the user, which is captured through the camera unit 140. As another example, the face recognizing unit 210 may estimate the entire face image based on a face shape and size detected from a partial image of the face of the user, which is captured through the camera unit 140.

According to various embodiments of the present disclosure, the face recognizing unit 210 may also estimate user authentication or an age group of the user through face recognition for an image captured through the camera unit 180. For example, the face recognizing unit 210 may extract a face region from an image using information such as brightness, motion, colors, and eye's positions for the image captured through the camera unit 140 and detect feature points of a face, such as eyes, a nose, and a mouth included in the face region. Thereafter, the face recognizing unit 210 may estimate the user authentication or the age group of the user by comparing positions and sizes of feature points included in the image and a distance between the feature points with reference image information stored in the data storing unit 112.

The control information extracting unit 220 executes the control information extraction program 115 stored in the program storing unit 111 and extracts control information according to face motion information recognized in the face recognizing unit 210. For example, the control information extracting unit 220 may extract control information corresponding to face motion information recognized through the face recognition program 114 and a type of a service provided from the processor 122 among at least one control information stored in the data storing unit 112. For example, when the application program driving unit 200 provides a video play service and face motion recognized through the face recognition program 114 moves out of a reference range, the control information extracting unit 220 may extract pause control information from the data storing unit 112. According to various embodiments of the present disclosure, if a plurality of faces is recognized in the face recognizing unit 210, the control information extracting unit 220 may extract control information based on motion information about at least one reference face among the plurality of faces. According to various embodiments of the present disclosure, the control information extracting unit 220 may also consider pupil motion information of the user together when extracting the control information.

According to various embodiments of the present disclosure, when the application program driving unit 200 provides an e-book service or an Internet service and the user recognized in the face recognizing unit 210 gazes at a reference region, the control information extracting unit 220 may extract screen scroll control information according to a position of the gaze of the user from the data storing unit 112. The control information extracting unit 220 may also determine a control variable for screen scroll based on at least one of an age group, a face motion speed, a face motion angle, a face motion distance, a face motion time of the user, and/or the like. The control variable for the screen scroll may include at least one of a scroll speed and display magnification of a screen in scrolling.

According to various embodiments of the present disclosure, the control information extracting unit 220 may extract control information for panning a screen displayed on the display unit 160 from the data storing unit 112 according to a face direction recognized in the face recognizing unit 210.

According to various embodiments of the present disclosure, when the application program driving unit 200 provides a call service, the control information extracting unit 220 may extract call reception control information according to a face direction recognized through the face recognizing unit 210 from the data storing unit 112. The control information extracting unit 220 may also determine a call receiving method based on at least one of a face motion speed, a face motion angle, a face motion distance, and a face motion time. The call receiving method may include one or more of call receiving acceptance, voice mail box connection, call receiving rejection, and/or the like.

According to various embodiments of the present disclosure, when the application program driving unit 200 provides an e-book service, the control information extracting unit 220 may extract control information such as bookmark setting information or page change information from the data storing unit 112 according to face motion information recognized in the face recognizing unit 210.

According to various embodiments of the present disclosure, when face motion recognized in the face recognizing unit 210 does not get out of a reference range, the control information extracting unit 220 may extract screen holding control information from the data storing unit 112. If a plurality of faces is recognized in the face recognizing unit 210, the control information extracting unit 220 may extract control information based on motion information about at least one reference face among the plurality of faces. The control information extracting unit 220 may also consider pupil motion information of the user together when extracting the control information.

The display controller 230 executes the GUI program 113 stored in the program storing unit 111 and controls the display unit 160 to a UI as graphics. For example, the display controller 230 may control the display unit 160 to display information about an application program executed in the application program driving unit 200.

According to various embodiments of the present disclosure, the electronic device 100 provides a control service according to face motion of the user using the processor 122 including the face recognizing unit 210 and the control information extracting unit 220.

According to various embodiments of the present disclosure, the electronic device 100 may include a separate control module for providing a control service according to face motion of the user.

Figure 3:
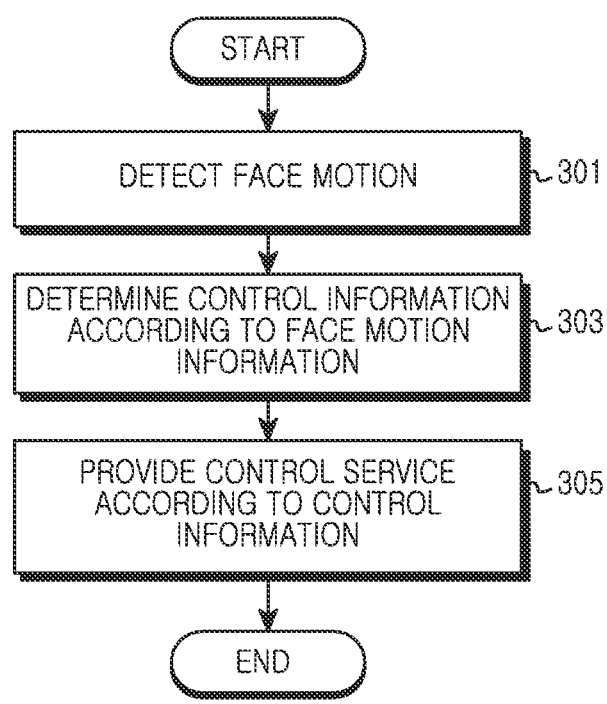
FIG. 3 is a flowchart illustrating a process of controlling a service based on face motion information in an electronic device according to an embodiment of the present disclosure.

FIG. 3 is a flowchart illustrating a process of controlling a service based on face motion information in an electronic device according to an embodiment of the present disclosure.

Referring to FIG. 3, at operation 301, the electronic device detects face motion. For example, the electronic device detects face motion of a user through an image of the user, which is captured through at least one camera. For example, the electronic device may estimate positions of eyes of the user on a face image of the user, which is captured through a camera unit. Thereafter, the electronic device may estimate face motion of the user based on a change in the positions of the eyes of the users. As another example, the electronic device may extract at least one feature point from a face image of the user, which is captured through the camera unit. Thereafter, the electronic device may estimate face motion of the user based on a change of at least one feature point included in the face image. According to various embodiments of the present disclosure, if only a part of a face of the user may be captured through the camera unit, the electronic device may estimate the entire face image using only the part of the face and extract face motion.

Thereafter, at operation 303, the electronic device determines control information according to face motion information. For example, the electronic device verifies control information according to the face motion information. For example, the electronic device may extract control information according to face motion information among at least one control information stored in a data storing unit. According to various embodiments of the present disclosure, the face motion information may include at least one of a face motion distance, a face direction, a face motion speed, a face motion angle, a face motion time, an age through face recognition, user authentication information, and/or the like.

After verifying the control information according to the face motion information, at operation 305, the electronic device controls a service according to the control information according to the face motion information. For example, the electronic device may pause video play according to the control information according to the face motion information. As another example, the electronic device may automatically scroll a screen according to the control information according to the face motion information. As another example, the electronic device may change a display region of e-book contents according to the control information according to the face motion information. As another example, the electronic device may set a bookmark to e-book contents according to the control information according to the face motion information. As another example, the electronic device may provide a call receiving service according to the control information according to the face motion information. As another example, the electronic device may pan a screen according to the control information according to the face motion information. As another example, the electronic device may control a screen inactivation mode according to the control information according to the face motion information. The screen inactivation mode means a control mode for dimming out a display unit to reduce power consumption when the electronic device does not detect input information during a certain time.

Figure 4:
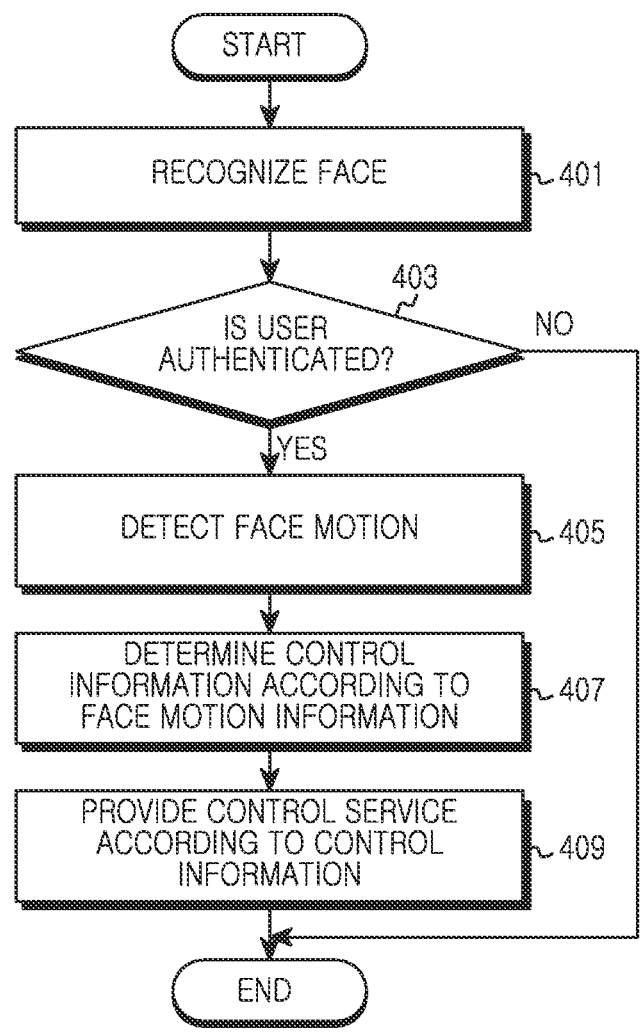
FIG. 4 is a flowchart illustrating a process of controlling a service based on face motion information in an electronic device according to an embodiment of the present disclosure.

FIG. 4 is a flowchart illustrating a process of controlling a service based on face motion information in an electronic device according to an embodiment of the present disclosure.

Referring to FIG. 4, at operation 401, the electronic device recognizes a face. For example, the electronic device performs face recognition through an image captured through at least one camera. For example, the electronic device may extract a face region from an image using information such as brightness, motion, colors, and eye's positions for the image captured through a camera unit, and may detect feature points of a face such as eyes, a noise, and a mouth included in the face region.

Thereafter, at operation 403, the electronic device determines whether a user is authenticated. For example, the electronic device verifies whether to authenticate a user of the electronic device through face recognition information. For example, the electronic device may verify whether to authenticate the user by comparing positions and sizes of feature points included in an image captured through the camera unit and a distance between the feature points with reference image information stored in a data storing unit. The reference image information may include a face image for at least one user who is preset to perform user authentication.

When the electronic device determines not to authenticate the user at operation 403, the electronic device recognizes that the electronic device may not provide a control service using face motion information. Therefore, the electronic device may end the process of controlling a service illustrated in FIG. 4. According to various embodiments of the present disclosure, the electronic device may repeatedly perform an authentication procedure of the user during the reference number of times.

In contrast, when the electronic device determines to authenticate the user at operation 403, the electronic device proceeds to operation 405 at which the electronic device detects face motion of the user through an image of the user (e.g., which is captured through at least one camera). For example, the electronic device may estimate positions of eyes of the user on a face image of the user, which is captured through the camera unit. Thereafter, the electronic device may estimate face motion of the user based on a change in the positions of the eyes of the users. As another example, the electronic device may extract at least one feature point from a face image of the user, which is captured through the camera unit. Thereafter, the electronic device may estimate face motion of the user based on a change of at least one feature point included in the face image. According to various embodiments of the present disclosure, if only a part of a face of the user may be captured through the camera unit, the electronic device may estimate the entire face image using only the part of the face and extract face motion.

Thereafter, at operation 407, the electronic device determines control information according to face motion information. For example, the electronic device verifies control information according to the face motion information. For example, the electronic device may extract control information according to face motion information among at least one control information stored in the data storing unit. According to various embodiments of the present disclosure, the face motion information may include at least one of a face motion distance, a face direction, a face motion speed, a face motion angle, a face motion time, an age through face recognition, user authentication information, and/or the like.

After verifying the control information according to the face motion information, at operation 409, the electronic device controls a service according to the control information according to the face motion information.

Figure 6:
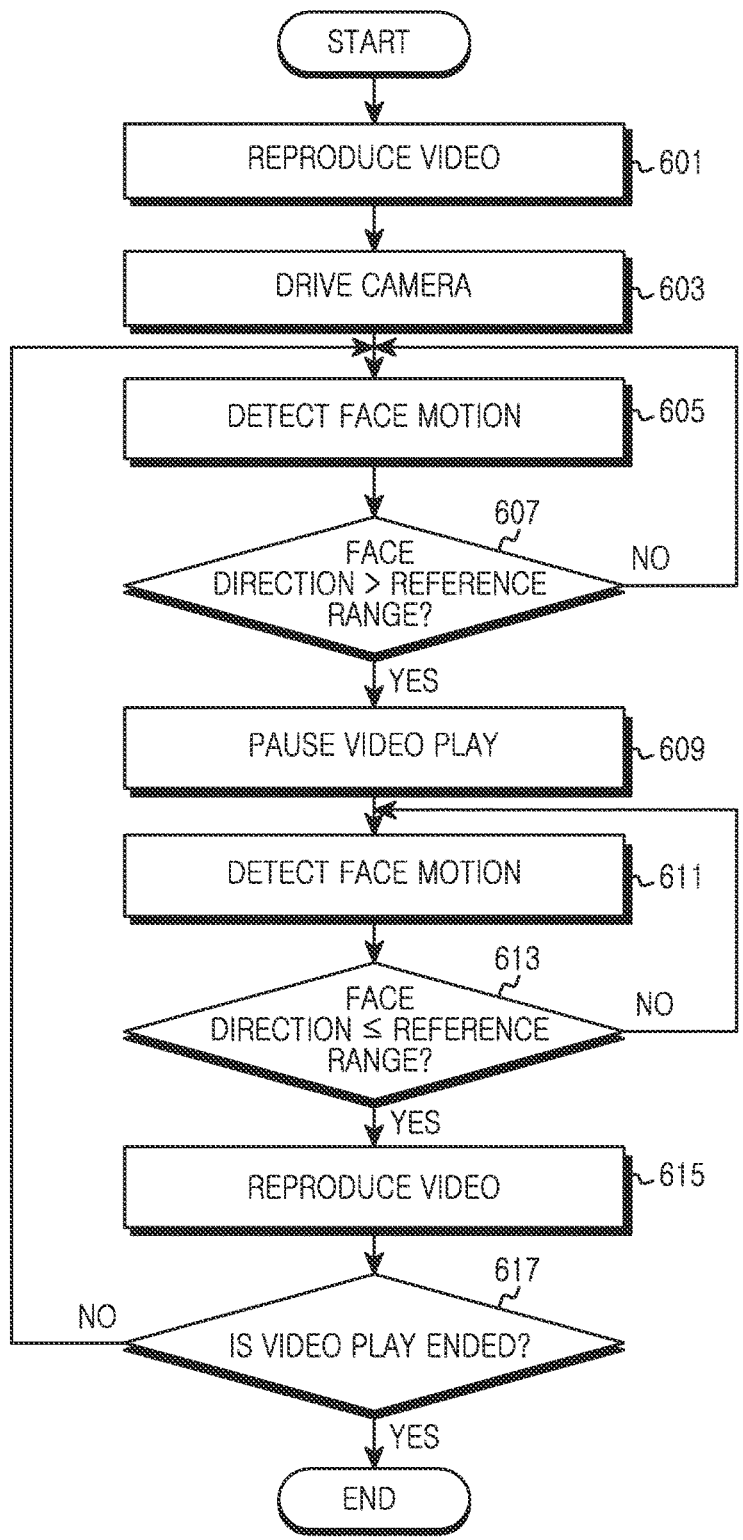
FIG. 6 is a flowchart illustrating a process of controlling video play based on face motion information in an electronic device according to an embodiment of the present disclosure.

FIG. 6 is a flowchart illustrating a process of controlling video play based on face motion information in an electronic device according to an embodiment of the present disclosure.

Referring to FIG. 6, at operation 601, the electronic device provides a video play service. For example, the electronic device may reproduce a selected video file. For example, the electronic device may reproduce a video file selected according to touch information provided through an input device. For example, the electronic device may display video play information on a display unit.

Thereafter, at operation 603, the electronic device drives a camera. For example, the electronic device may activate a camera unit which is located in the same direction as the display unit which displays a reproducing video to extract face motion of a user while the video is reproduced.

After driving the camera, at operation 605, the electronic device detects a face motion. For example, the electronic device detects face motion of the user using a face image of the user (e.g., which is captured through the camera). For example, the electronic device may estimate positions of eyes of the user on a face image of the user, which is captured through the camera unit. Thereafter, the electronic device may estimate face motion of the user based on a change in the positions of the eyes of the user. As another example, the electronic device may extract at least one feature point from a face image of the user, which is captured through the camera unit. Thereafter, the electronic device may estimate face motion of the user based on a change of at least one feature point included in the face image. According to various embodiments of the present disclosure, if only a part of the face of the user may be captured through the camera unit, the electronic device may estimate the entire face image using only the part of the face and extract face motion.

Thereafter, at operation 607, the electronic device determines whether the face direction is greater than a threshold (e.g., a reference range). For example, the electronic device verifies whether a face direction is greater than a reference range. For example, the electronic device may estimate an angle of the face and verify whether a direction of the face moves out of a display region of the display unit. The electronic device may determine, based on the face direction in relation to the reference range, whether a user is viewing the display region (e.g., the video).

Figure 8A:
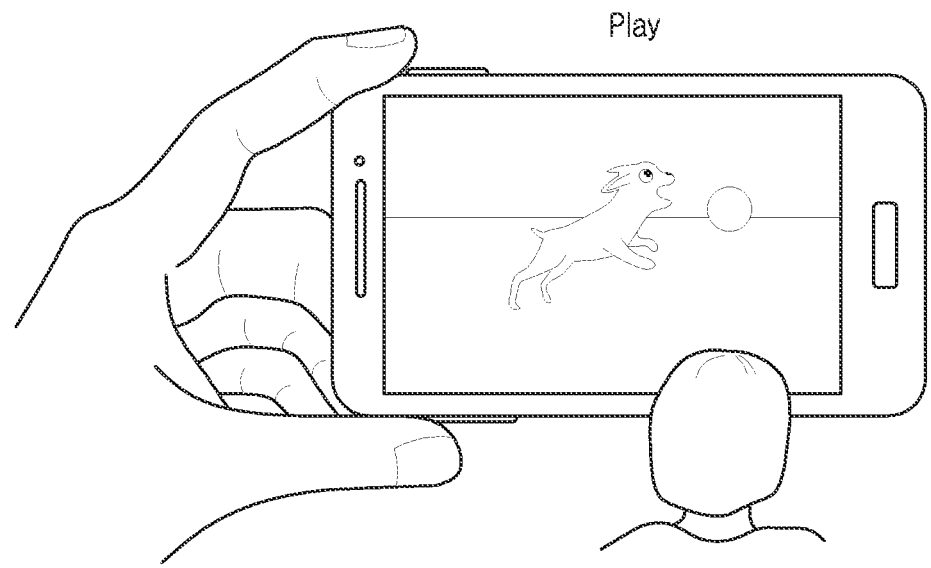
FIGS. 8A and 8B illustrate screens for controlling video play based on face motion information in an electronic device according to an embodiment of the present disclosure.
Figure 8B:
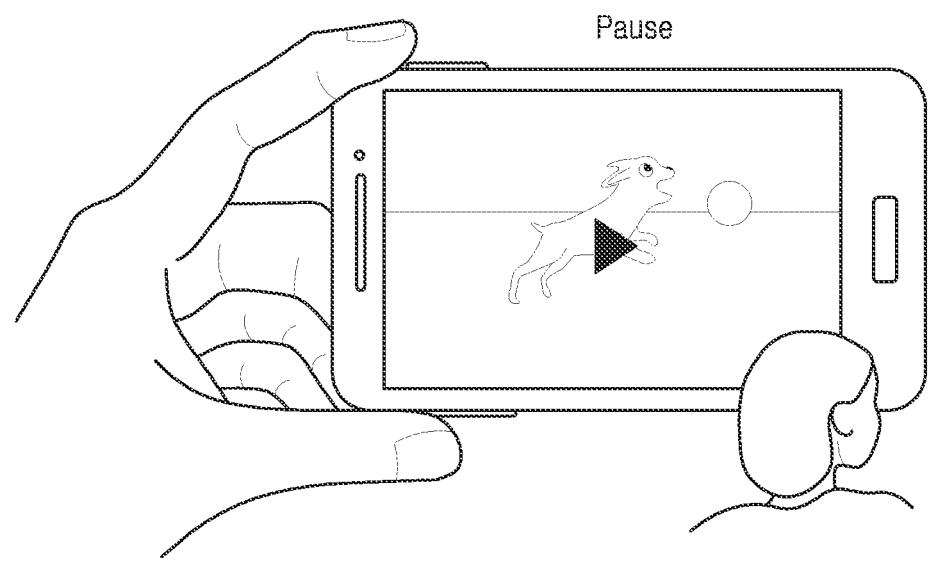

FIGS. 8A and 8B illustrate screens for controlling video play based on face motion information in an electronic device according to an embodiment of the present disclosure.

Referring to FIG. 8A, a user's face is facing the display region of the display unit. For example, based on positioning of the user's face relative to the display unit, the user may be assumed to be watching the display unit (e.g., the video being reproduced thereon).

Referring to FIG. 8B, a user's face is facing away from the display region of the display unit. For example, based on positioning of the user's face relative to the display unit, the user may be assumed to be not watching the display unit (e.g., the video being reproduced thereon).

When the electronic device determines the face direction is less than or equal to the reference range at operation 607, the electronic device recognizes that the direction of the face of the user is located within the display region of the display unit. For example, the electronic device may recognize, as illustrated in FIG. 8A, that the user enjoys a video. Therefore, the electronic device may return to operation 605 at which the electronic device may detect face motion of the user using a face image of the user, which is captured through the camera. According to various embodiments of the present disclosure, when the user's face is direction is less than or equal to the reference range, the electronic device may hold a video play state. For example, when the user's face is direction is less than or equal to the reference range, the electronic device may continue to play (e.g., reproduce) the video on the display unit.

In contrast, when the electronic device determines that the face direction is greater than the reference range at operation 607, the electronic device recognizes that the direction of the face of the user moves out of the display region of the display unit. For example, according to various embodiments of the present disclosure, the electronic device may recognize, as illustrated in FIG. 8B, that the user does not enjoy the video (or is otherwise preoccupied or distracted from watching the video). Therefore, according to various embodiments of the present disclosure, when the electronic device determines that the face direction is greater than the reference range, the electronic device may proceed to operation 609 at which the electronic device may pause video play.

At operation 611, the electronic device detects a face motion. For example, at operation 611, the electronic device detects face motion of the user using a face image of the user (e.g., which is captured through the camera). According to various embodiments of the present disclosure, the electronic device may detect face motion of the user before a driving time of a timer for verifying a screen inactivation time expires. According to various embodiments of the present disclosure, the timer is activated in a time point when video play is paused.

Thereafter, at operation 613, the electronic device determines whether a face direction is less than or equal to a threshold (e.g., a reference range). For example, the electronic device verifies whether a face direction is less than or equal to a reference range. For example, the electronic device may verify that the direction of the face is located within the display region of the display unit.

When the electronic device determines that the face direction is greater than the reference range at operation 613, the electronic device recognizes the direction of the face of the user moves out of the display region of the display unit. The electronic device may determine, based on the face direction in relation to the reference range, whether a user is viewing the display region (e.g., the video). Therefore, the electronic device may detect face motion of the user using a face image of the user, which is captured through the camera. According to various embodiments of the present disclosure, when the user's face is direction is greater than the reference range, the electronic device holds a pause state of video play. For example, when the user's face is direction is greater than the reference range, the electronic device may pause (e.g., stop reproduction of) the video on the display unit.

In contrast, when the electronic device determines that the face direction is less than or equal to the reference range at operation 613, the electronic device recognizes that the direction of the face of the user is located within the display region of the display unit. Accordingly, the electronic device may proceed to operation 615 at which the electronic device may reproduce a video. For example, the electronic device may reproduce a video from a play time point when video play is paused in operation 609.

Thereafter, at operation 617, the electronic device determines whether the video play is ended. For example, the electronic device verifies whether video play is ended.

When the electronic device determines that the video play is not ended at operation 617, the electronic device may proceed to operation 605 at which the electronic device may detect face motion of the user using a face image of the user (e.g., which is captured through the camera).

In contrast, when the electronic device determines that the video play is ended at operation 617, the electronic device may end the process of controlling video play illustrated in FIG. 6.

According to various embodiments of the present disclosure, the electronic device may pause video play when the face direction of the user moves out of the reference range. According to various embodiments of the present disclosure, if a time when the face direction of the user moves out of the reference range is greater than a reference time, the electronic device may pause video play.

According to various embodiments of the present disclosure, the electronic device may pause video play in consideration of face motion and pupil motion of the user together. For example, when the electronic device recognizes (e.g., determines) that the user does not gaze at a display region of the display unit in consideration of the face motion and pupil motion of the user together, the electronic device may pause video play.

Figure 7:
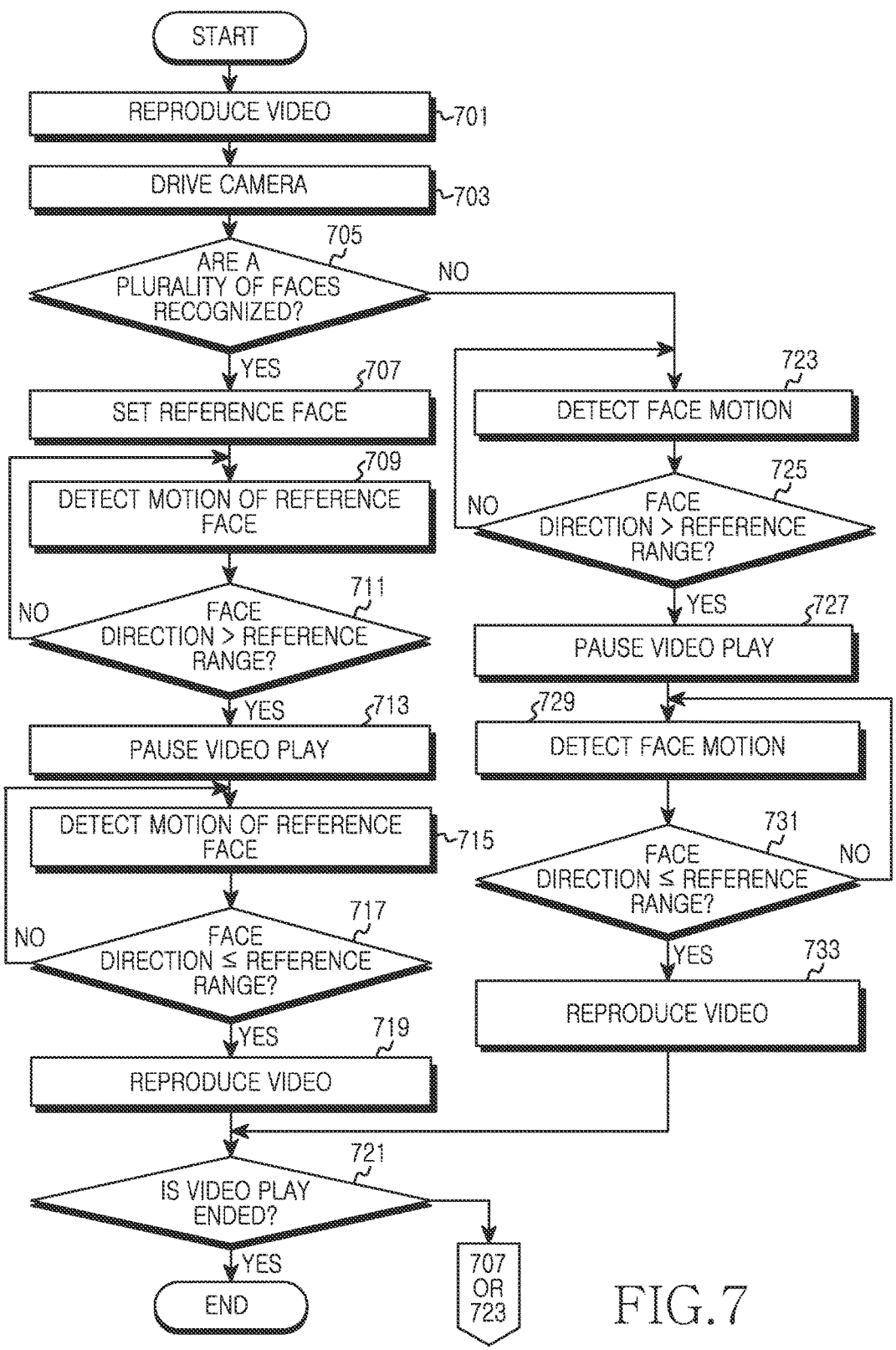
FIG. 7 is a flowchart illustrating a process of controlling video play based on face motion information in an electronic device according to an embodiment of the present disclosure.

FIG. 7 is a flowchart illustrating a process of controlling video play based on face motion information in an electronic device according to an embodiment of the present disclosure.

Referring to FIG. 7, at operation 701, reproduces a video. For example, the electronic device provides a video play service. For example, the electronic device may reproduce a selected video file (e.g., a video file selected according to touch information provided through an input device). For example, the electronic device may display video play information on a display unit.

Thereafter, at operation 703, the electronic device drives a camera. For example, the electronic device may activate a camera unit which is located in the same direction as the display unit which displays a reproducing video to extract face motion of a user while the video is reproduced.

After driving the camera, at operation 705, the electronic device determines whether a plurality of faces is recognized. For example, the electronic device verifies whether a plurality of faces is recognized on an image captured through the camera.

When the electronic device determines that the plurality of faces is recognized at operation 705, the electronic device proceeds to operation 707 at which the electronic device sets any one of the plurality of faces to a reference face. For example, when a face of a baby and a face of a mother are recognized, the electronic device may set the face of the mother to a reference face. As another example, when a plurality of faces of a similar age group is recognized, the electronic device may set a predetermined face to a reference face. According to various embodiments of the present disclosure, when a plurality of faces of a similar age group is recognized, the electronic device may display a reference face selection pop-up window and set a face selected on the reference face selection pop-up window to a reference face.

After setting any one of the plurality of faces to the reference face, at operation 709, the electronic device detects motion of the reference face using an image captured through the camera.

Thereafter, at operation 711, the electronic device determines whether a direction of the reference face is greater than a threshold (e.g., a reference range). For example, the electronic device verifies whether a direction of the reference face is greater than a reference range. For example, the electronic device may estimate an angle of the reference face and verify whether a direction of the reference face moves out of a display region of the display unit.

When the electronic device determines that the direction of the reference face is less than or equal to the reference range at operation 711, the electronic device recognizes that the direction of the reference face is located within the display region of the display unit. For example, the electronic device may recognize, as illustrated in FIG. 8A, that a user of the reference face is attentive to (e.g., enjoys) a video. Therefore, when the electronic device determines that the direction of the reference face is less than or equal to the reference range, the electronic device may proceed to operation 709 at which the electronic device may detect motion of the reference face captured through the camera. According to various embodiments of the present disclosure, when the direction of the reference face is less than or equal to the reference range, the electronic device may hold a video play state.

In contrast, when the electronic device determines that the face direction is greater than the reference range at operation 711, the electronic device recognizes that the direction of the reference face moves out of the display region of the display unit. For example, the electronic device may recognize, as illustrated in FIG. 8B, that the user of the reference face does not enjoy the video. Therefore, according to various embodiments of the present disclosure, when the electronic device determines that the face direction is greater than the reference range, the electronic device may proceed to operation 713 at which the electronic device may pause video play. According to various embodiments of the present disclosure, when the face direction is greater than the reference range, the electronic device may pause the video play.

At operation 715, the electronic device detects motion of the reference face using an image captured through the camera. The electronic device may detect motion of the reference face before a driving time of a timer for verifying a screen inactivation time expires. According to various embodiments of the present disclosure, the timer is activated in a time point when video play is paused.

Thereafter, at operation 717, the electronic device determines whether the face direction is less than or equal to a threshold (e.g., a reference range). For example, the electronic device verifies whether a direction of the reference face is less than or equal to a reference range. For example, the electronic device may verify that the direction of the reference face is located within the display region of the display unit.

When the electronic device determines that the face direction is greater than the reference range at operation 717, the electronic device recognizes that the direction of the reference face moves out of the display region of the display unit. Therefore, according to various embodiments of the present disclosure, when the electronic device determines that the face direction is greater than the reference range, the electronic device may proceed to operation 715 at which the electronic device may detect motion of the reference face using an image captured through the camera. For example, according to various embodiments of the present disclosure, when the face direction is greater than the reference range, the electronic device holds a pause state of video play.

In contrast, when the electronic device determines that the direction of the reference face is less than or equal to the reference range at operation 717, the electronic device recognizes that the direction of the reference face is located within the display region of the display unit. Therefore, according to various embodiments of the present disclosure, when the electronic device determines that the direction of the reference face is less than or equal to the reference range, the electronic device may proceed to operation 719 at which the electronic device may reproduce a video. For example, according to various embodiments of the present disclosure, when the direction of the reference face is less than or equal to the reference range, the electronic device may reproduce a video from a play time point when video play is paused at operation 713.

Thereafter, at operation 721, the electronic device determines whether the video play is ended. For example, the electronic device verifies that the video play is ended.

In contrast, when the electronic device determines that a plurality of faces is not recognized at operation 705, the electronic device may proceed to operation 723 at which the electronic device detects a face motion. For example, when only one face is recognized at operation 705, the electronic device detects face motion of a user using an image captured through the camera at operation 723.

Thereafter, at operation 725, the electronic device determines whether the face direction is greater than a threshold (e.g., a reference range). For example, the electronic device verifies whether a face direction is greater than a reference range. For example, the electronic device may estimate an angle of the face and verify whether a direction of the face moves out of the display region of the display unit.

When the electronic device determines that the face direction is less than or equal to the reference range at operation 725, the electronic device recognizes that the direction of the face of the user is located within the display region of the display unit. For example, the electronic device may recognize, as illustrated in FIG. 8A, that the user is attentive to (e.g., enjoys) a video. Therefore, when the electronic device determines that the face direction is less than or equal to the reference range, the electronic device may return to operation 723 at which the electronic device may detect face motion of the user using a face image of the user (e.g., which is captured through the camera). According to various embodiments of the present disclosure, when the face direction is less than or equal to the reference range, the electronic device holds a video play state.

In contrast, when the electronic device determines that the face direction is greater than the reference range at operation 725, the electronic device recognizes that the direction of the face of the user moves out of the display region of the display unit. For example, the electronic device may recognize, as illustrated in FIG. 8B, that the user is not attentive to (e.g., does not enjoy, or is otherwise distracted from) the video. Therefore, when the electronic device determines that the face direction is greater than the reference range, the electronic device may proceed to operation 727 at which the electronic device may pause video play.

In addition, at operation 729, the electronic device detects a face motion. For example, the electronic device detects face motion of the user using a face image of the user (e.g., which is captured through the camera). According to various embodiments of the present disclosure, the electronic device may detect face motion of the user before a driving time of a timer for verifying a screen inactivation time expires. According to various embodiments of the present disclosure, the timer is activated in a time point when video play is paused.

Thereafter, at operation 731, the electronic device determines whether a face direction is less than or equal to a threshold (e.g., a reference range). For example, the electronic device verifies whether a face direction is less than or equal to a reference range. For example, the electronic device may verify that the direction of the face is located within the display region of the display unit.

When the electronic device determines that the face direction is greater than the reference range at operation 731, the electronic device recognizes the face direction of the user moves out of the display region of the display unit. Therefore, when the face direction is greater than the reference range at operation 731, the electronic device may return to operation 729 at which the electronic device may detect face motion of the user using a face image of the user (e.g., which is captured through the camera). According to various embodiments of the present disclosure, when the electronic device determines that the face direction is greater than the reference range the electronic device holds a pause state of video play.

In contrast, when the electronic device determines that the face direction is less than or equal to the reference range at operation 731, the electronic device recognizes that the direction of the face of the user is located within the display region of the display unit. Accordingly, when the electronic device determines that the face direction is less than or equal to the reference range, the electronic device may proceed to operation 733 at which the electronic device may reproduce a video. For example, when the face direction is less than or equal to the reference range, the electronic device may reproduce a video from a play time point when video play is paused at operation 727.

Thereafter, at operation 721, the electronic device determines whether the video play is ended. For example, the electronic device verifies whether video play is ended.

According to various embodiments of the present disclosure, when the electronic device determines that the video play is not ended at operation 721, the electronic device proceeds to operation 707 or 723 at which the electronic device detects face motion of the user using an image captured through the camera.

In contrast, when the electronic device determines that the video play is ended at operation 721, the electronic device may end the process of controlling video play illustrated in FIG. 7.

According to various embodiments of the present disclosure, the electronic device may pause video play when the direction of the face of the user moves out of the reference range. In case a time when the face direction of the user moves out of the reference range is greater than a reference time, the electronic device may pause video play.

According to various embodiments of the present disclosure, the electronic device may pause video play in consideration of face motion and pupil motion of the user together. For example, when the electronic device recognizes (e.g., determines) that the user does not gaze at a display region of the display unit in consideration of the face motion and pupil motion of the user together, the electronic device may pause video play.

FIGS. 11A, 11B, 11C, and 11D illustrate screens for scrolling a screen based on face motion information in an electronic device according to an embodiment of the present disclosure.

Referring to FIGS. 11A and 11B, a user's head (e.g., face, pupils, and/or the like) is moved up in relation to a display unit of the electronic device. The electronic device may detect that the user's head (e.g., face, pupils, and/or the like) is moved in relation to the display unit of the electronic device, and scroll the content in the display region of the display unit in consideration of the movement of the user's head (e.g., face, pupils, and/or the like).

Referring to FIG. 11C, if the user's head (e.g., face, pupils, and/or the like) is maintained in an up position in relation to a display unit of the electronic device, the electronic device may continue a scrolling operation of the content in the display region of the display unit.

Referring to FIG. 11D, if the user's head (e.g., face, pupils, and/or the like) is moved down in relation to a display unit of the electronic device (e.g., so as to be returned to an original or resting position), the electronic device may stop a scrolling operation of the content in the display region of the display unit.

Figure 9:
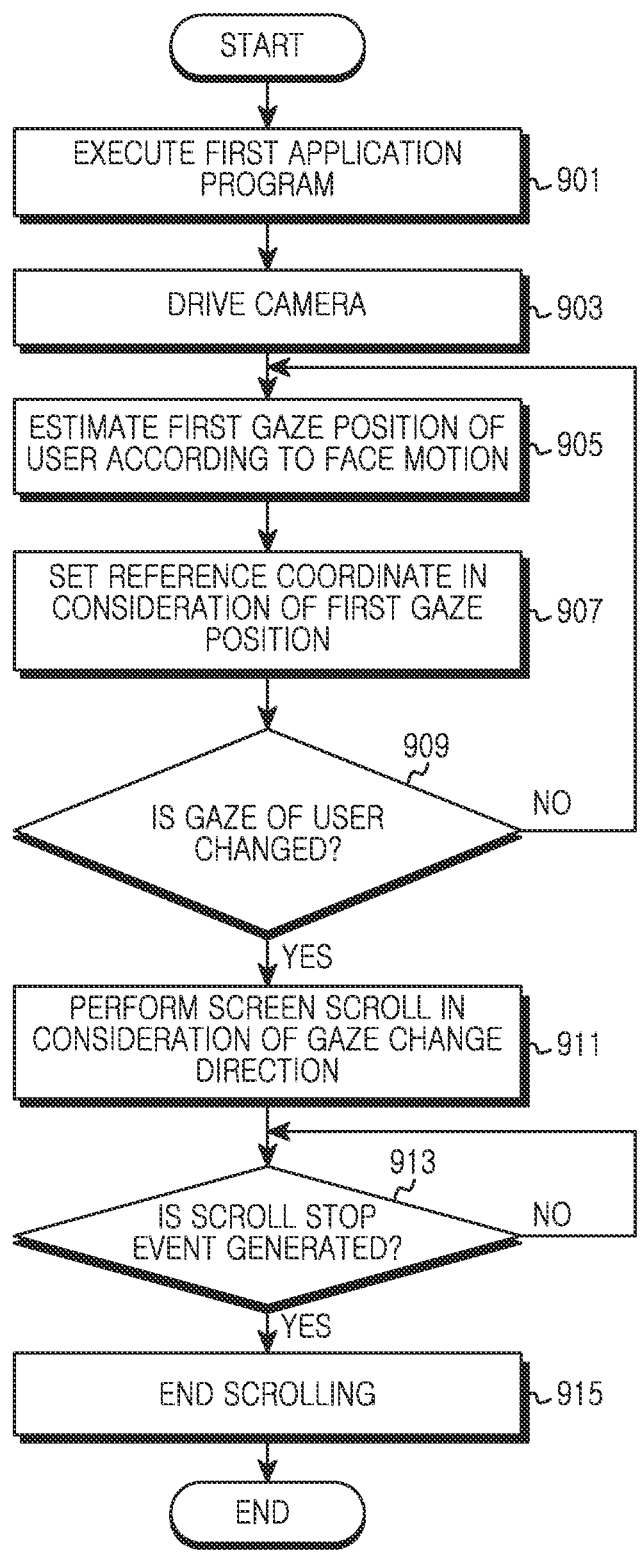
FIG. 9 is a flowchart illustrating a process of scrolling a screen based on face motion information in an electronic device according to an embodiment of the present disclosure.

FIG. 9 is a flowchart illustrating a process of scrolling a screen based on face motion information in an electronic device according to an embodiment of the present disclosure.

Referring to FIG. 9, at operation 901, the electronic device executes a first application program and provides a service according to the first application program. For example, the electronic device may provide a service which supports a scroll function.

Providing the service which supports the scroll function, at operation 903, the electronic device drives a camera. For example, the electronic device may activate a camera unit which is located in the same direction as a display unit which displays a service screen according to the first application program.

After driving the camera, at operation 905, the electronic device detects face motion of a user using an image captured through the camera and estimates a first gaze position of the user. For example, the electronic device may detect eyes of the user or positions of the eyes of the user from an image captured through the camera. Thereafter, the electronic device may detect a relative position of the eyes of the user from a frame defined by an angle of view of the camera.

After estimating the first gaze position of the user, at operation 907, the electronic device determines a reference coordinate based on the first gaze position of the user. For example, the electronic device may set the reference coordinate in consideration of the first gaze position of the user. For example, when the eyes of the user are fixed at the first gaze position during a reference time or more, the electronic device may set a coordinate of the first gaze position to a reference coordinate.

Thereafter, at operation 909, the electronic device determines whether the gaze of the user is changed. For example, the electronic device verifies whether the gaze of the user is changed. For example, the electronic device may verify whether the positions of the eyes of the user move out of the reference coordinate. According to various embodiments of the present disclosure, the electronic device may verify whether the gaze of the user moves out of a reference range centered on the reference coordinate.

When the electronic device determines that the gaze of the user moves out of the reference coordinate at operation 909, the electronic device recognizes that the gaze of the user is changed. Therefore, when the electronic device determines that the gaze of the user moves out of the reference coordinate, the electronic device proceeds to operation 911 at which the electronic device scrolls a screen according to a gaze change direction of the user. For example, as illustrated in FIG. 11A, when the gaze of the user is moved up the reference coordinate, the electronic device may recognize that the user verifies (e.g., selects) service contents of an upper portion. Accordingly, as illustrated in FIG. 11B, the electronic device may scroll down a service screen. As another example, when the gaze of the user is moved down the reference coordinate, the electronic device may recognize that the user verifies (e.g., selects) service contents of a lower portion. Accordingly, the electronic device may scroll up a service screen. As another example, when the gaze of the user is moved to a more right-hand side than the reference coordinate, the electronic device may recognize that the user verifies (e.g., selects) service contents of a left portion. Accordingly, the electronic device may scroll the service screen to a left-hand side. As another example, when the gaze of the user is moved to a more left-hand side than the reference coordinate, the electronic device may recognize that the user verifies (e.g., selects) service contents of a right portion. Accordingly, the electronic device may scroll the service screen to a right-hand side.

Thereafter, at operation 913, the electronic device determines whether a scroll stop event is generated. For example, the electronic device verifies whether a scroll stop event is generated. For example, the electronic device may verify whether the gaze of the user is changed in a direction which is different from a change direction of the gaze of the user at operation 911.

When the electronic device determines that the gaze of the user is not changed or when a change in the same direction as the change direction of the gaze of the user is detected, the electronic device may recognize that the scroll stop event is not generated. Therefore, when the electronic device determines that the gaze of the user is not changed or when a change in the same direction as the change direction of the gaze of the user is detected, the electronic device scrolls a screen according to a gaze change direction of the user at operation 911. For example, when the gaze of the user is moved up the reference coordinate, as illustrated in FIG.

11B, the electronic device may scroll down a service screen. As illustrated in FIG. 11C, if the gaze of the user is fixed, the electronic device holds the scrolling-down of a service screen.

At operation 913, the electronic device determines whether a scroll stop event is generated.

If the electronic device determines that a scroll stop event has not been generated at operation 913, then the electronic device may continue to poll for generation of a scroll stop event.

When the electronic device determines that the gaze of the user is changed to a direction which is different from the change direction of the gaze of the user at operation 911, the electronic device may recognize that the scroll stop event is generated at operation 913. Therefore, when the electronic device determines that the gaze of the user is changed to a direction which is different from the change direction of the gaze of the user at operation 911, the electronic device may proceed to operation 915 at which the electronic device stops a screen scroll. For example, as illustrated in FIG. 11B, when the gaze of the user is moved up the reference coordinate, the electronic device may scroll down a service screen. As illustrated in FIG. 11D, if the gaze of the user is moved down the reference coordinate, the electronic device ends the scrolling of a service screen.

According to various embodiments of the present disclosure, the electronic device may perform a screen scroll in a direction which is different from the gaze direction of the user.

According to various embodiments of the present disclosure, the electronic device may perform a screen scroll in the same direction as the gaze direction of the user. For example, when the gaze of the user is moved up the reference coordinate, the electronic device may scroll up a service screen according to the gaze direction of the user. As another example, when the gaze of the user is moved down the reference coordinate, the electronic device may scroll down a service screen according to the gaze direction of the user. As another example, when the gaze of the user is moved to a more right-hand side than the reference coordinate, the electronic device may scroll a service screen to a right-hand side. As another example, when the gaze of the user is moved to a more left-hand side than the reference coordinate, the electronic device may scroll a service screen to a left-hand side.

FIGS. 12A and 12B illustrate face motion of a user for determining a scroll variable according to an embodiment of the present disclosure.

Referring to FIG. 12A, a face motion in a left and a right direction may be used for determining a scroll variable.

Referring to FIG. 12B, a face motion in a forward and backward direction may be used for determining a scroll variable.

Figure 10:
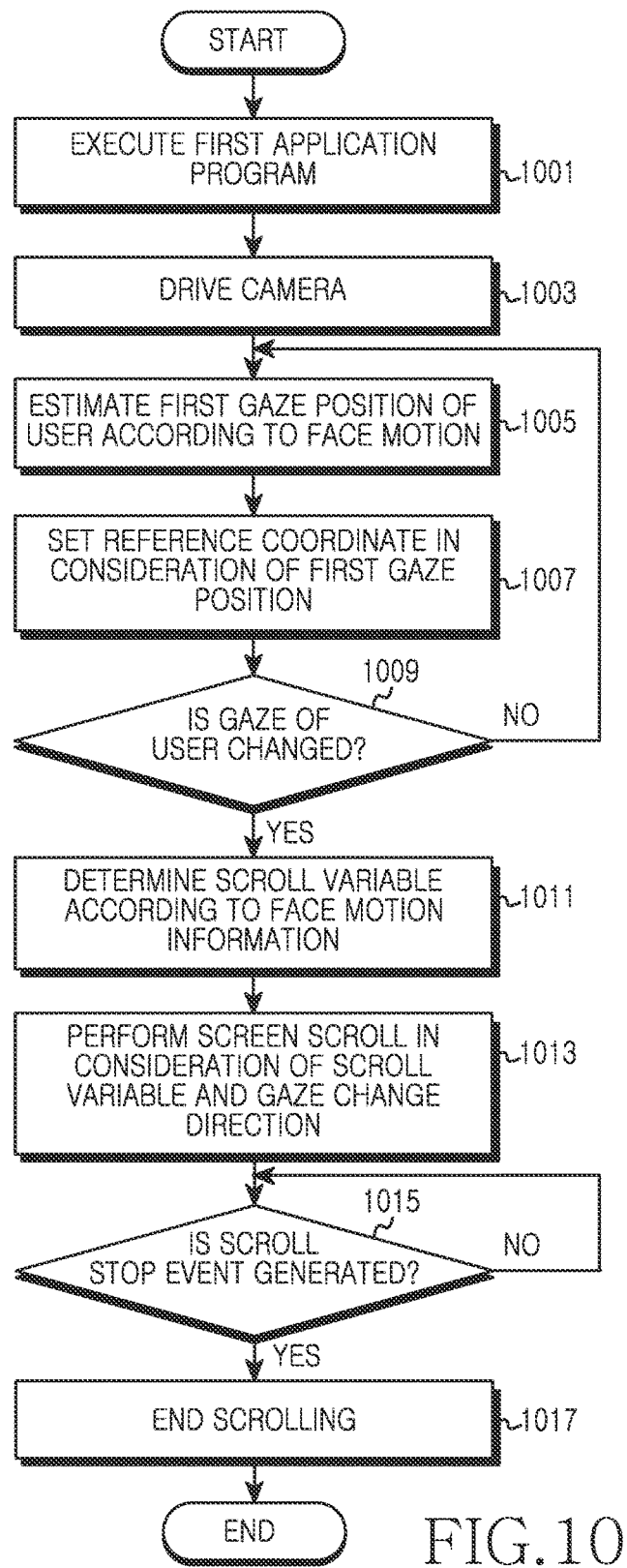
FIG. 10 is a flowchart illustrating a process of scrolling a screen based on face motion information in an electronic device according to an embodiment of the present disclosure.

FIG. 10 is a flowchart illustrating a process of scrolling a screen based on face motion information in an electronic device according to an embodiment of the present disclosure.

Referring to FIG. 10, at operation 1001, the electronic device executes a first application program. For example, the electronic device executes a first application program and provides a service according to the first application program. For example, the electronic device may provide a service which supports a scroll function.

Providing the service which supports the scroll function, at operation 1003, the electronic device drives a camera. For example, the electronic device may activate a camera unit which is located in the same direction as a display unit which displays a service screen according to the first application program.

After driving the camera, at operation 1005, the electronic device estimates a first gaze position of a user according to a face motion. For example, the electronic device detects face motion of a user using an image captured through the camera and estimates a first gaze position of the user. For example, the electronic device may detect eyes of the user or positions of the eyes of the user from an image captured through the camera. Thereafter, the electronic device may detect a relative position of the eyes of the user from a frame defined by an angle of view of the camera.

After estimating the first gaze position of the user, at operation 1007, the electronic device determines a reference coordinate based on the first gaze position of the user. For example, the electronic device sets a reference coordinate in consideration of a first gaze position. For example, when the eyes of the user are fixed at the first gaze position during a reference time or more, the electronic device may set a coordinate of the first gaze position to a reference coordinate.

Thereafter, at operation 1009, the electronic device determines whether a gaze of a user is changed. For example, the electronic device verifies whether the gaze of the user is changed. For example, the electronic device may verify whether the positions of the eyes of the user moves out of the reference coordinate. According to various embodiments of the present disclosure, the electronic device may verify whether the gaze of the user moves out of a reference range centered on the reference coordinate.

If the electronic device determines that a gaze of a user is changed at operation 1009, the electronic device may proceed to operation 1011 at which the electronic device determines a scroll variable according to face motion information. For example, when the gaze of the user moves out of the reference coordinate, the electronic device recognizes that the gaze of the user is changed. Therefore, according to various embodiments of the present disclosure, when the gaze of the user moves out of the reference coordinate, the electronic device determines a scroll variable based on face motion information of the user. For example, as illustrated in FIG. 12A, when a face direction of the user is changed left or right, the electronic device may determine a scroll speed based on face change angles 1201, 1203, 1205, 1207, 1209, and 1211. As another example, as illustrated in FIG. 12B, when a face center of the user is changed forward or backward, the electronic device may determine a scroll speed based on face change angles 1221, 1223, 1225, 1227, 1229, and 1231. As another example, the electronic device may determine a scroll speed based on a motion speed of a face of the user.

After determining the scroll variable, at operation 1013, the electronic device scrolls a screen according to a gaze change direction of the user and the scroll variable. In addition, when the gaze of the user is fixed, the electronic device may change a scroll speed in proportion to information about a time when the gaze of the user is fixed.

Thereafter, at operation 1015, the electronic device determines whether a scroll stop event is generated. For example, the electronic device verifies whether a scroll stop event is generated. For example, the electronic device may verify whether the gaze of the user is changed in a direction which is different from a change direction of the gaze of the user in operation 1013.

When the electronic device determines that the gaze of the user is not changed or when a change in the same direction as the change direction of the gaze of the user is detected at operation 1015, the electronic device may recognize that the scroll stop event is not generated. Therefore, the electronic device scrolls a screen according to a gaze change direction of the user in operation 1013. For example, as illustrated in FIG. 11B, when the gaze of the user is moved up the reference coordinate, the electronic device may scroll down a service screen. As illustrated in FIG. 11C, if the gaze of the user is fixed, the electronic device holds the scrolling-down of a service screen. If the electronic device determines that the scroll stop event is not generated at operation 1015, the electronic device may continue to poll for generation of a scroll stop event.

When the electronic device determines, at operation 1015, that the gaze of the user is changed to a direction which is different from the change direction of the gaze of the user at operation 1013, the electronic device may recognize that the scroll stop event is generated. Therefore, when the gaze of the user is changed to a direction which is different from the change direction of the gaze of the user at operation 1013, the electronic device may proceed to operation 1017 at which the electronic device stops a screen scroll. For example, as illustrated in FIG. 11B, when the gaze of the user is moved up the reference coordinate, the electronic device may scroll down a service screen. As illustrated in FIG. 11D, if the gaze of the user is moved down the reference coordinate, the electronic device ends the scrolling of a service screen.

According to various embodiments of the present disclosure, after executing the application program, the electronic device may set a coordinate at which the gaze of the user is fixed during the reference time to the reference coordinate for scrolling.

According to various embodiments of the present disclosure, the electronic device may use a predetermined reference coordinate. In this case, when the gaze of the user moves out of the reference coordinate and is fixed during a reference time, the electronic device may perform scrolling based on at least one of a gaze direction and face motion information of the user.

According to various embodiments of the present disclosure, the electronic device may control a scroll speed and display magnification of a service screen based on an age group of the user, which is verified through face recognition.

Figure 14:
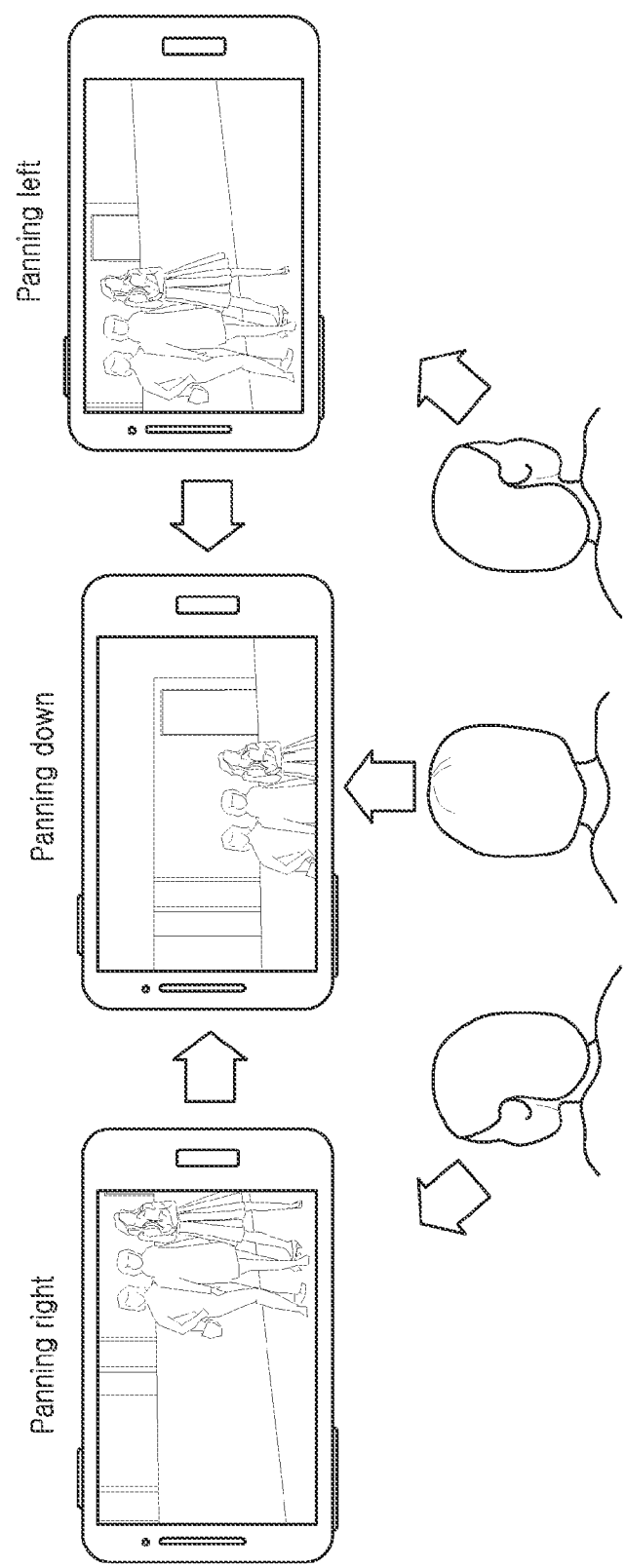
FIGS. 14A, 14B, and 14C illustrate screens for panning a screen based on face motion information in an electronic device according to an embodiment of the present disclosure.

FIGS. 14A, 14B, and 14C illustrate screens for panning a screen based on face motion information in an electronic device according to an embodiment of the present disclosure.

Referring to FIG. 14A, a screen may be panned right based on a face motion of a user. For example, the screen may be panned right based on a face motion towards a left direction.

Referring to FIG. 14B, a screen may be panned down based on a face motion of a user. For example, the screen may be panned down based on a face motion downwards.

Referring to FIG. 14C, a screen may be panned left based on a face motion of a user. For example, the screen may be panned left based on a face motion towards a right direction.

Figure 13:
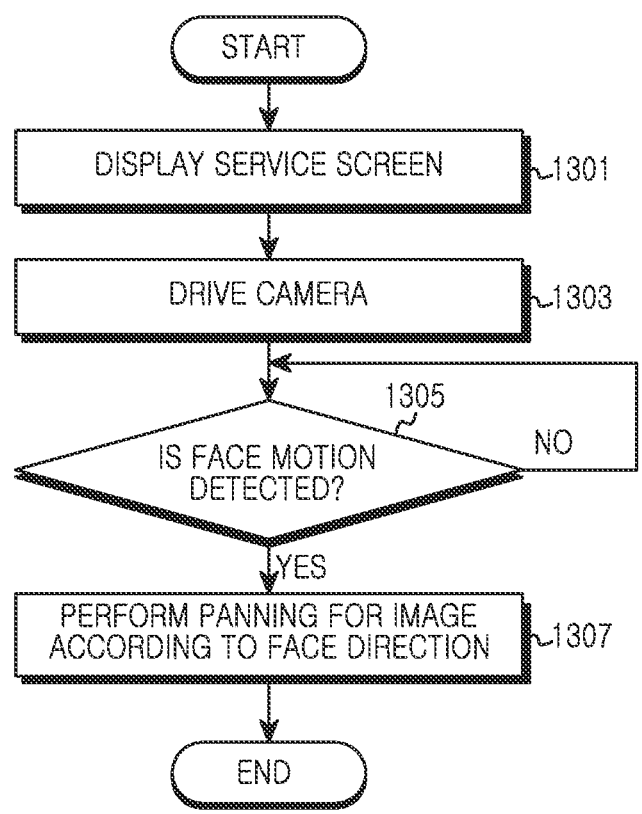
FIG. 13 is a flowchart illustrating a process of panning a screen based on face motion information in an electronic device according to an embodiment of the present disclosure.

FIG. 13 is a flowchart illustrating a process of panning a screen based on face motion information in an electronic device according to an embodiment of the present disclosure.

Referring to FIG. 13, at operation 1301, the electronic device displays a service screen on a display unit.

Thereafter, at operation 1303, the electronic device drives a camera. For example, the electronic device activates a camera unit which is located in the same direction as the display unit which displays the service screen.

After driving the camera, at operation 1305, the electronic device determines whether a face motion is detected. For example, the electronic device verifies whether face motion of a user is detected using an image captured through the camera. The electronic device may verify whether motion of a face of the user is detected in a reference range or more based on a face direction of the user, which is first detected after the camera is driven. For example, the electronic device estimates positions of eyes of the user on a face image of the user, which is captured through the camera unit. Thereafter, the electronic device verifies whether a change in the positions of the eyes of the user is detected. As another example, the electronic device extracts at least one feature point from a face image of the user, which is captured through the camera unit. Thereafter, the electronic device may verify whether a change of at least one feature point included in the face image is detected.

If the electronic device determines that a face motion is not detected at operation 1305, then the electronic device may poll for detection of a face motion.

In contrast, upon detecting the face motion of the user at operation 1305, the electronic device proceeds to operation 1307 at which the electronic device performs a panning for an image according to a face direction. For example, the electronic device pans the service screen based on face motion information of the user. For example, as illustrated in FIG. 14B, when a face of the user is moved up the electronic device may pan down a service screen. As another example, as illustrated in FIG. 14B, when the face of the user is moved in a left direction the electronic device may pan a service screen right. As another example, as illustrated in FIG. 14C, when the face of the user is moved in a right direction the electronic device may pan a service screen left.

According to various embodiments of the present disclosure, the electronic device may change display magnification of a service screen based on a distance change between the user and the electronic device when panning the service screen.

Figure 17C:
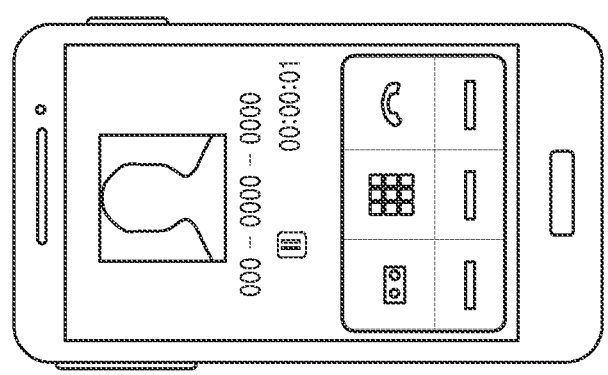
FIGS. 17A, 17B, and 17C illustrate screens for controlling a call receiving service based on face motion information in an electronic device according to an embodiment of the present disclosure.
Figure 17B:
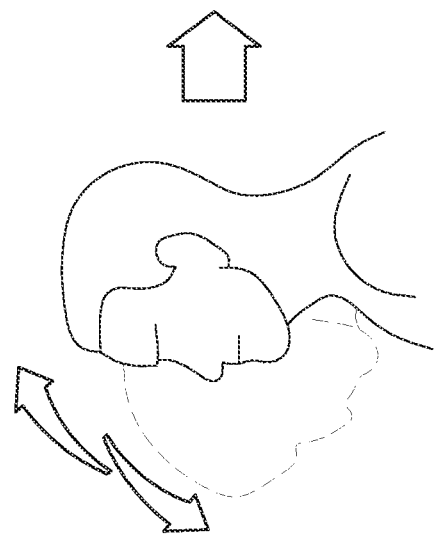
Figure 17A:
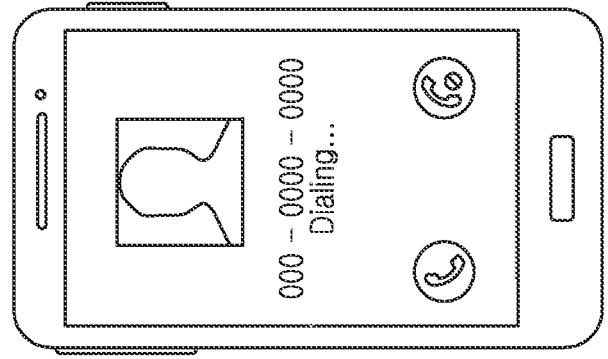

FIGS. 17A, 17B, and 17C illustrate screens for controlling a call receiving service based on face motion information in an electronic device according to an embodiment of the present disclosure.

Referring to FIG. 17A, a call function may be initiated. For example, the electronic device may receive a call.

Referring to FIG. 17B, a user may move the user's head (e.g., so as to generate a face motion). For example, the electronic device may detect the face motion.

Referring to FIG. 17C, the electronic device may control a call function according to a detected face motion. For example, the electronic device may answer an incoming call according to the detected face motion.

Figure 15:
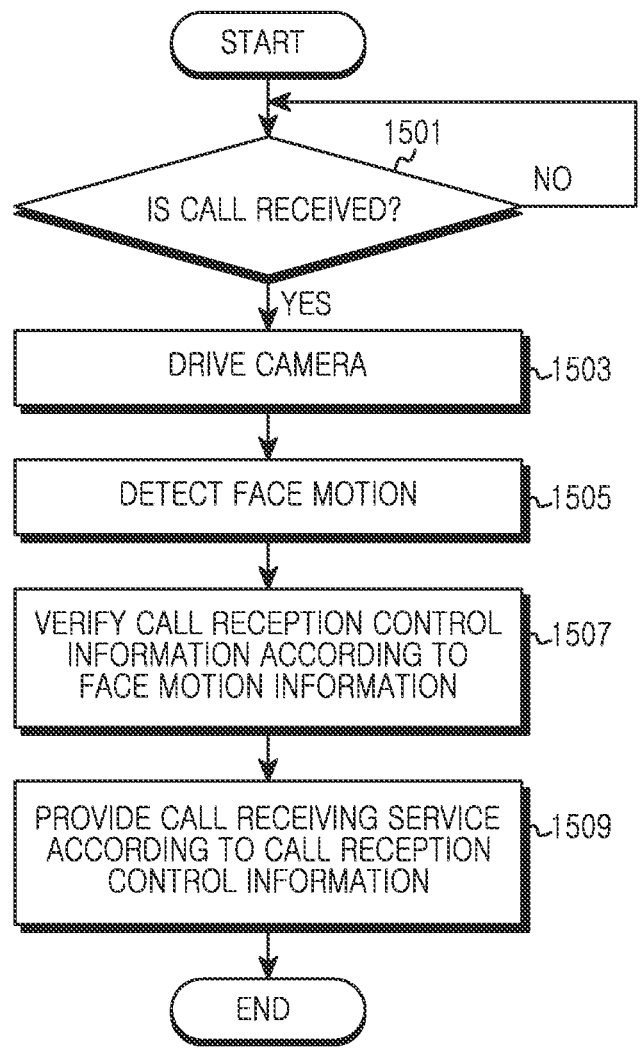
FIG. 15 is a flowchart illustrating a process of controlling a call receiving service based on face motion information in an electronic device according to an embodiment of the present disclosure.

FIG. 15 is a flowchart illustrating a process of controlling a call receiving service based on face motion information in an electronic device according to an embodiment of the present disclosure.

Referring to FIG. 15, at operation 1501, the electronic device determines whether a call is received. For example, the electronic device verifies whether a call is received.

If the electronic device determines that a call is not received at operation at operation 1501, then the electronic device may continue to poll for an incoming call. As an example, the electronic device may perform corresponding functions while polling for an incoming call.

In contrast, if the electronic device determines that a call is received at operation 1501, then the electronic device proceeds to operation 1503 at which the electronic device drives a camera. For example, as illustrated in FIG. 17A, when receiving the call, the electronic device may display a call receiving screen on a display unit. Thereafter, the electronic device activates a camera unit which is located in the same direction as the display unit which displays the call receiving screen.

After driving the camera, at operation 1505, the electronic device detects a face motion. For example, the electronic device detects face motion of a user using a face image of the user, which is captured through the camera. For example, the electronic device may estimate positions of eyes of the user on a face image of the user, which is captured through the camera unit. Thereafter, the electronic device may estimate face motion of the user based on a change in the positions of the eyes of the user. As another example, the electronic device may extract at least one feature point from a face image of the user, which is captured through the camera unit. Thereafter, the electronic device may estimate face motion of the user based on a change of at least one feature point included in the face image. According to various embodiments of the present disclosure, capturing only a part of the face of the user through the camera unit, the electronic device may estimate the entire face image using only the part of the face and extract face motion.

After detecting the face motion of the user, at operation 1507, the electronic device determines a call reception control information according to face motion information. For example, the electronic device verifies call reception control information according to face motion information. The electronic device determines call reception control information based on at least one of a face direction, a face motion speed, a face motion angle, a face motion time of the user, and the like. For example, as illustrated in FIG. 17B, when movement to a front/rear of the face of the user is detected, the electronic device may recognize (e.g., determine) that the detected movement is call reception acceptance information. As another example, when movement to the left/right of the face of the user is detected, the electronic device may recognize (e.g., determine) that the detected movement is call reception rejection information. According to various embodiments of the present disclosure, the electronic device may determine a call reception rejection method based on a left/right movement distance of the face of the user. According to various embodiments of the present disclosure, when the left/right movement distance of the face of the user is less than a reference distance, the electronic device determines a call reception rejection method using a voice mail box. In contrast, according to various embodiments of the present disclosure, when the left/right movement distance of the face of the user is greater than or equal to the reference distance, the electronic device determines a call reception rejection method of immediately blocking a call connection.

After verifying the call reception control information according to the face motion information, at operation 1509, the electronic device provides a call receiving service according to call reception control information. For example, the electronic device provides a call receiving service according to the call reception control information according to the face motion information. For example, as illustrated in FIG. 17B, when the electronic device recognizes that call reception is accepted according to the movement to the front/rear of the face of the user, the electronic device provides, as illustrated in FIG. 17C, a call service with a counterpart's electronic device.

Figure 16:
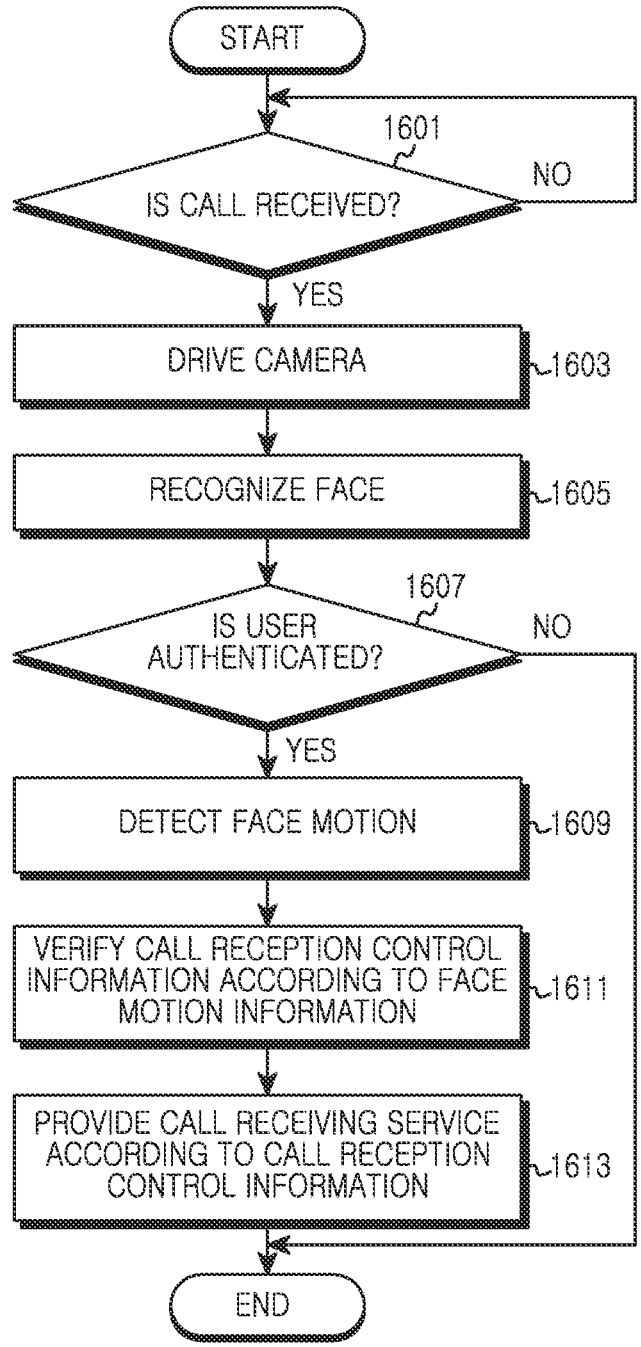
FIG. 16 is a flowchart illustrating a process of controlling a call receiving service based on face motion information in an electronic device according to an embodiment of the present disclosure.

FIG. 16 is a flowchart illustrating a process of controlling a call receiving service based on face motion information in an electronic device according to an embodiment of the present disclosure.

Referring to FIG. 16, at operation 1601, the electronic device determines whether a call is received. For example, the electronic device verifies whether a call is received.

If the electronic device determines that a call is not received at operation at operation 1601, then the electronic device may continue to poll for an incoming call. As an example, the electronic device may perform corresponding functions while polling for an incoming call.

In contrast, if the electronic device determines that a call is received at operation 1601, then the electronic device proceeds to operation 1603 at which the electronic device drives a camera. For example, as illustrated in FIG. 17A, when receiving the call, the electronic device may display a call receiving screen on a display unit. Thereafter, the electronic device activates a camera unit which is located in the same direction as the display unit which displays the call receiving screen.

After driving the camera, at operation 1605, the electronic device recognizes a face. For example, the electronic device performs face recognition through an image captured through the camera. For example, the electronic device extracts a face region from an image captured through the camera unit using information such as brightness, motion, colors, eye's positions for the image captured through the camera unit and detects feature points of a face of a user, such as eyes, a nose, and a mouth included in the face region.

Thereafter, at operation 1607, the electronic device determines whether a user is authenticated. For example, the electronic device verifies whether to authenticate the user of the electronic device through face recognition information. For example, the electronic device may verify whether to authenticate the user by comparing positions and sizes of feature points included in an image captured through the camera unit and a distance between the feature points with reference image information stored in a data storing unit. The reference image information may include a face image for at least one user who is preset to perform user authentication.

When the electronic device determines that the user is not authenticated at operation 1607, the electronic device may recognize that the electronic device may not provide a control service using face motion information. Therefore, the electronic device may end the process of controlling a call receiving service illustrated in FIG. 16. The electronic device may also repeat an authentication procedure of the user during the reference number of times.

In contrast, when the electronic device determines that the user is authenticated, the electronic device proceeds to operation 1609 at which the electronic device detects a face motion. For example, the electronic device detects face motion of the user using a face image of the user, which is captured through the camera.

After detecting the face motion of the user, at operation 1611, the electronic device determines a call reception control information according to face motion information. For example, the electronic device verifies call reception control information according to face motion information. The electronic device may determine call reception control information based on at least one of a face direction, a face motion speed, a face motion angle, a face motion time of the user, and the like. For example, as illustrated in FIG. 17B, when movement to a front/rear of the face of the user is detected, the electronic device may recognize that the detected movement is call reception acceptance information. As another example, when movement to the left/right of the face of the user is detected, the electronic device may recognize that the detected movement is call reception rejection information. According to various embodiments of the present disclosure, the electronic device may determine a call reception rejection method based on a left/right movement distance of the face of the user. According to various embodiments of the present disclosure, when the left/right movement distance of the face of the user is less than a reference distance, the electronic device determines a call reception rejection method using a voice mail box. In contrast, according to various embodiments of the present disclosure, when the left/right movement distance of the face of the user is greater than or equal to the reference distance, the electronic device determines a call reception rejection method of immediately blocking a call connection.

After verifying the call reception control information according to the face motion information, at operation 1613, the electronic device provides a call receiving service according to call reception control information. For example, the electronic device provides a call receiving service according to the call reception control information according to the face motion information. For example, as illustrated in FIG. 17B, when the electronic device recognizes that call reception is accepted according to the movement to the front/rear of the face of the user, then, as illustrated in FIG. 17C, the electronic device provides a call service with a counterpart's electronic device.

FIGS. 19A and 19B illustrate screens for controlling an e-book service based on face motion information in an electronic device according to an embodiment of the present disclosure.

Referring to FIG. 19A, the electronic device may determine a face motion of a user. For example, the electronic device may determine whether a user is looking towards a bottom right corner of a page (e.g., of an e-book).

Referring to FIG. 19B, the electronic device may turn a page of an e-book according to a face motion. For example, the electronic device may turn a page to proceed to the next page if the electronic device determines that a user looks at a bottom right corner of the page.

Figure 18:
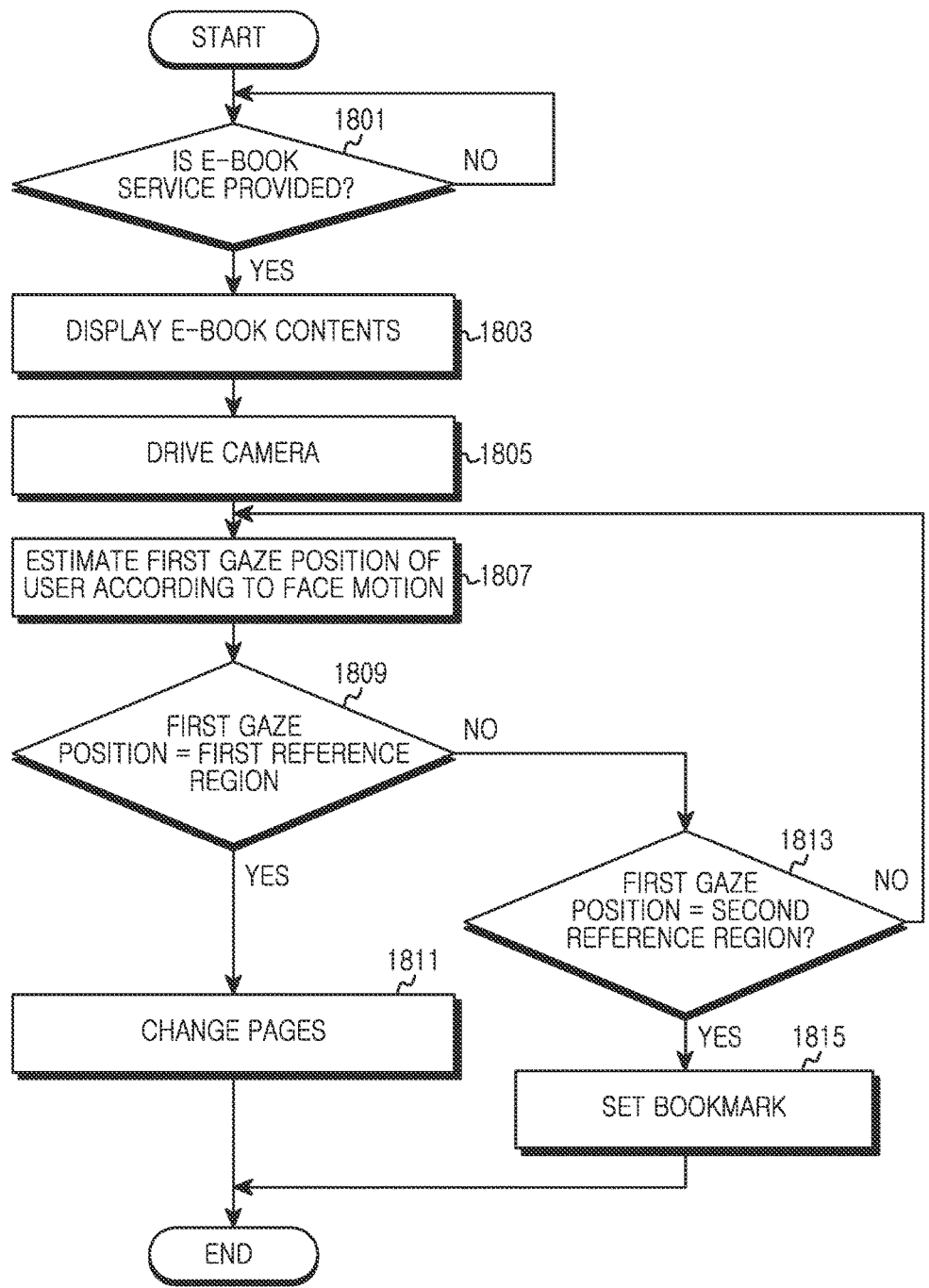
FIG. 18 is a flowchart illustrating a process of controlling an e-book service based on face motion information in an electronic device according to an embodiment of the present disclosure.

FIG. 18 is a flowchart illustrating a process of controlling an e-book service based on face motion information in an electronic device according to an embodiment of the present disclosure.

Referring to FIG. 18, at operation 1801, the electronic device determines whether to provide an e-book service. For example, the electronic device verifies whether to provide an e-book service. For example, the electronic device may verify whether any one of at least one e-book file stored in a data storing unit is selected according to touch information provided through an input device.

If the electronic device determines not to provide an e-book service at operation 1801, the electronic device may continue to poll for an indication to provide an e-book service (e.g., a request to provide an e-book service, a launching of an e-book application, and/or the like). As an example, the electronic device may perform corresponding functions while polling for an indication that an e-book service is to be provided.

In contrast, if the electronic device determines to provide the e-book service at operation 1801, then the electronic device proceeds to operation 1803 at which the electronic device displays e-book contents. For example, the electronic device displays e-book contents selected for the e-book service on a display unit.

Thereafter, at operation 1805, the electronic device drives a camera. For example, the electronic device activates a camera unit which is located in the same direction as the display unit which displays the e-book contents.

After driving the camera, at operation 1807, the electronic device estimates a first gaze position of a user according to a face motion. For example, the electronic device detects face motion of a user and estimates a gaze position of the user. For example, the electronic device may detect eyes of the user or positions of the eyes of the user from an image captured through the camera. Thereafter, the electronic device may detect a relative position of the eyes of the user from a frame defined by an angle of view of the camera.

Thereafter, at operation 1809, the electronic device determines whether a first gaze position is equal to (e.g., or substantially equal to) a first reference region. For example, the electronic device verifies whether the gaze of the user is located at a first reference region. For example, as illustrated in FIG. 19A, the electronic device may verify whether the gaze of the user is fixed at the first reference region 1901 during a reference time or more.

When the electronic device determines that the gaze of the user is located at the first reference region at operation 1809, the electronic device may proceed to operation 1811 at which the electronic device changes a display region for the e-book contents. For example, as illustrated in FIG. 19B, the electronic device may change a page of the e-book contents. If the gaze of the user is fixed at the first reference region, the electronic device may continuously change pages for the e-book contents. The electronic device may also control a page change speed to be proportional to a fixed time for the first reference region of the gaze of the user.

In contrast, when the electronic device determines that the gaze of the user is not located at the first reference region at operation 1809, the electronic device proceeds to operation 1813 at which the electronic device determines whether the first gaze position is equal to (e.g., or substantially equal to) a second reference region. For example, the electronic device verifies whether the gaze of the user is located at a second reference region. For example, as illustrated in FIG. 19A, the electronic device may verify whether the gaze of the user is fixed at the second reference region 1903 during a reference time or more.

When the electronic device determines that the gaze of the user is not located at the second reference region at operation 1813, the electronic device may proceed to operation 1807 at which the electronic device estimates a gaze direction of the user according to face motion of the user.

In contrast, when the electronic device determines that the gaze of the user is located at the second reference region at operation 1815, the electronic device sets a bookmark to a display region of the e-book contents displayed on the display unit.

In an embodiment of the present disclosure, the electronic device may control e-book contents using a predetermined reference region. The electronic device may also set the reference region based on the face motion of the user. For example, the electronic device may set the reference region based on a coordinate at which the gaze of the user is fixed during a reference time or more.

According to various embodiments of the present disclosure, the electronic device may control an e-book service based on a motion direction of a face of the user. For example, as illustrated in FIG. 5C, when the face of the user is moved left/right, the electronic device may change pages of e-book contents according to a motion direction of the face of the user. As another example, as illustrated in FIG.

5B, when a face center of the user is moved up/down, the electronic device may set a bookmark to a display region of e-book contents displayed on the display unit.

According to various embodiments of the present disclosure, the electronic device may also control display magnification for e-book contents based on an age group of the user, which is verified through face recognition.

Figure 21A:
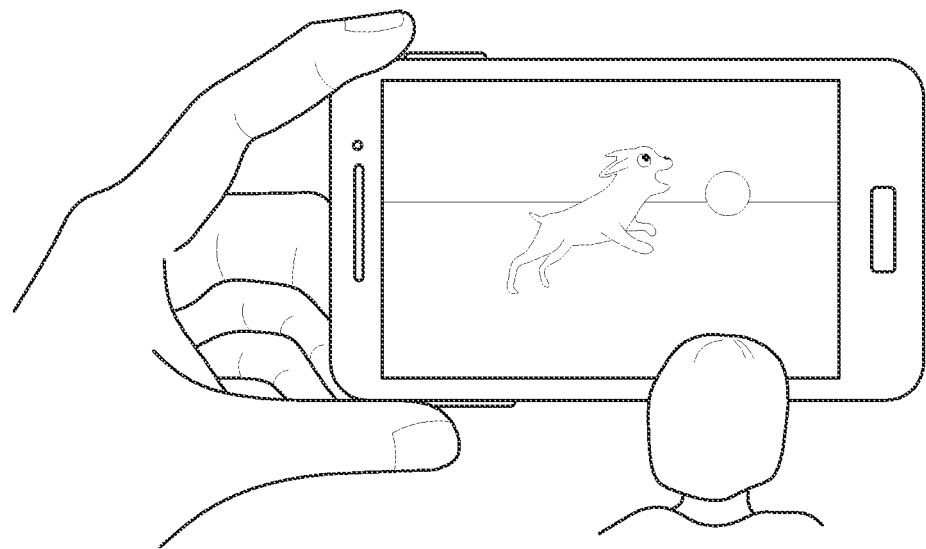
FIGS. 21A and 21B illustrate screens for controlling a screen inactivation mode based on face motion information in an electronic device according to an embodiment of the present disclosure.
Figure 21B:
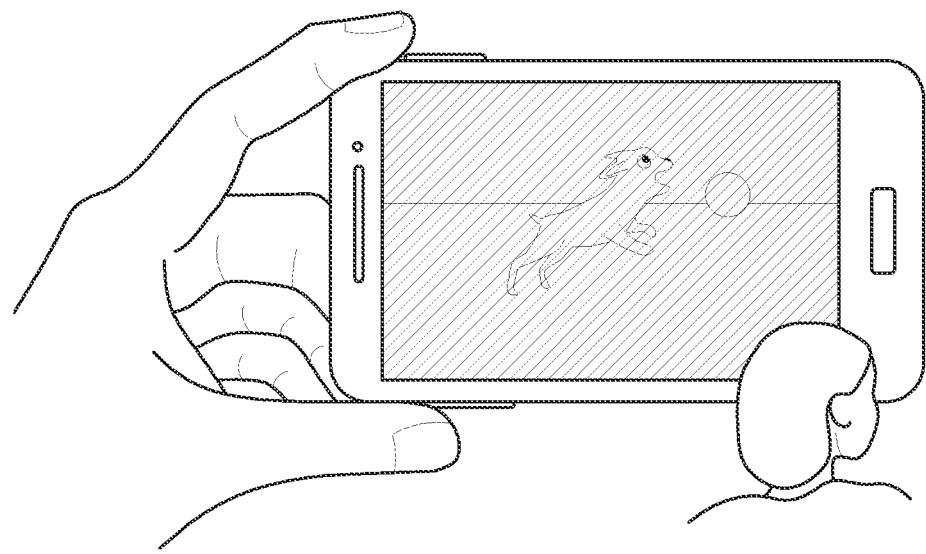

FIGS. 21A and 21B illustrate screens for controlling a screen inactivation mode based on face motion information in an electronic device according to an embodiment of the present disclosure.

Referring to FIG. 21A, the user may watch a display on the display unit (e.g., a webpage displayed on the display unit). The electronic device may determine that the user is watching the display on the display unit.

Referring to FIG. 21B, the user may be inattentive in relation to the display on the display unit. For example, the user may glance away from (or otherwise be distracted) in relation to the display on the display unit. The electronic device may determine that the user is not watching the display on the display unit.

Figure 20:
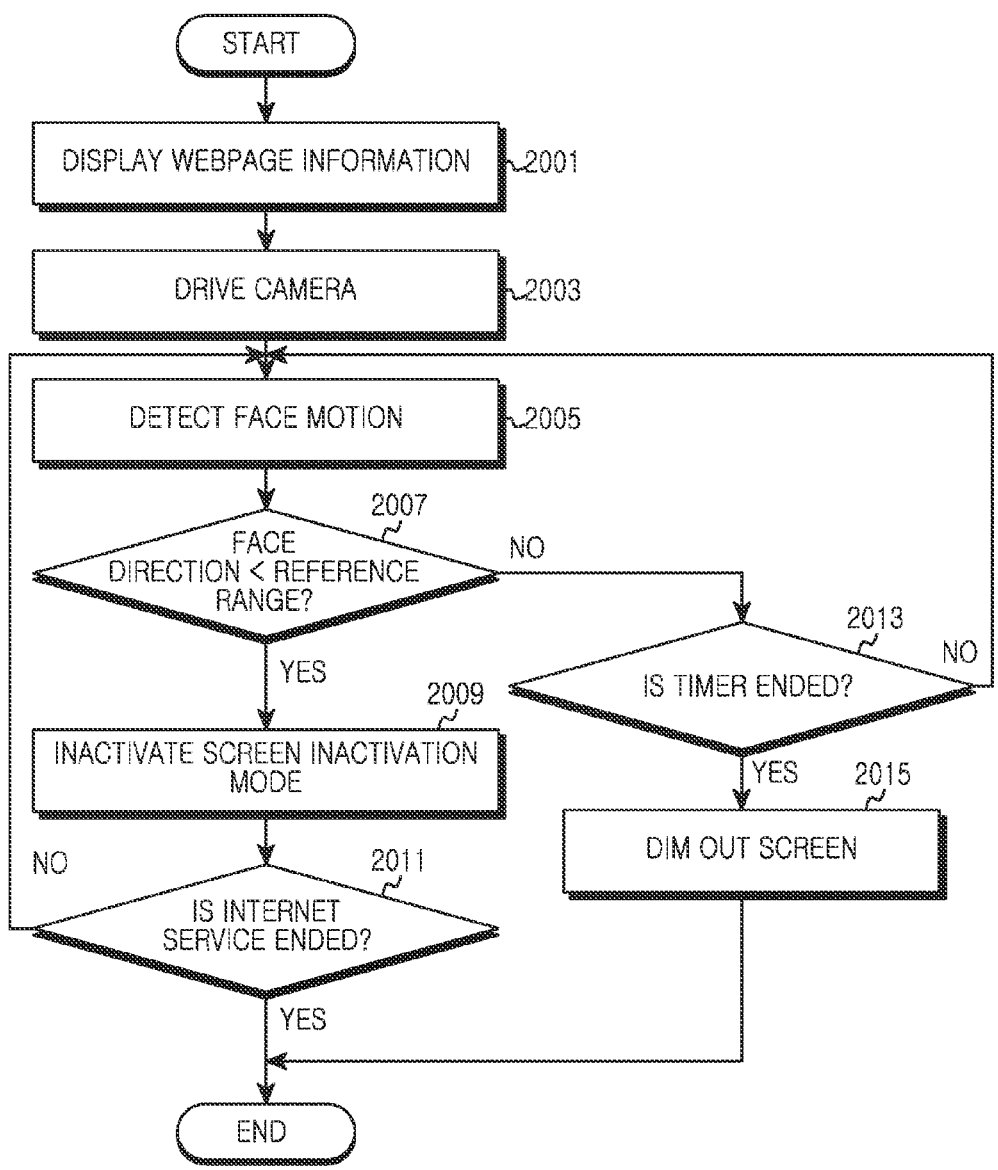
FIG. 20 is a flowchart illustrating a process of controlling a screen inactivation mode based on face motion information in an electronic device according to an embodiment of the present disclosure.

FIG. 20 is a flowchart illustrating a process of controlling a screen inactivation mode based on face motion information in an electronic device according to an embodiment of the present disclosure.

Referring to FIG. 20, at operation 2001, the electronic device may display webpage information. For example, the electronic device displays webpage information for an Internet service on a display unit.

Thereafter, at operation 2003, the electronic device drives a camera. For example, the electronic device activates a camera unit which is located in the same direction as the display unit which displays the webpage information.

After driving the camera, at operation 2005, the electronic device detects face motion of a user using a face image of the user (e.g., which is captured through the camera). For example, the electronic device may estimate positions of eyes of the user on a face image of the user, which is captured through the camera unit. Thereafter, the electronic device may estimate face motion of the user based on a change in the positions of the eyes of the user. For example, the electronic device may extract at least one feature point from a face image of the user, which is captured through the camera unit. Thereafter, the electronic device may estimate face motion of the user of a change of at least one feature point included in the face image. When the electronic device may capture only a part of a face of the user through the camera unit, the electronic device may extract an estimate of the entire face image using only the part of the face and extract face motion.

Thereafter, at operation 2007, the electronic device determines whether a face direction is less than a reference range. For example, the electronic device verifies whether a face direction of the user is less than a reference range. For example, according to various embodiments of the present disclosure, the electronic device may estimate an angle of a face and verify whether a direction of the face is located within a display region of the display unit.

When the electronic device determines that the face direction is less than the reference range (e.g., if the face direction is located within the reference range), the electronic device recognizes that the direction of the face of the user is located within the display region of the display unit. For example, as illustrated in FIG. 21A, the electronic device recognizes that the user sees a webpage. Therefore, when the face direction is less than the reference range (e.g., if the face direction is located within the reference range), the electronic device proceeds to operation 2009 at which the electronic device inactivates a screen inactivation mode. For example, although the electronic device does not detect input information during a certain time, the electronic device holds (e.g., maintains) the display unit at a backlight state.

Thereafter, at operation 2011, the electronic device determines whether the internet service is ended. For example, the electronic device verifies whether an Internet service is ended.

When the electronic device determines that the Internet service is not ended at operation 2011, the electronic device may proceed to operation 2005 at which the electronic device detects face motion of the user using a face image of the user, which is captured through the camera.

In contrast, when the electronic device determines that the Internet service is ended at operation at 2011, the electronic device ends the process of controlling a screen inactivation mode illustrated in FIG. 20.

In contrast, when the electronic device determines that the face direction is greater than or equal to the reference range at operation 2007, the electronic device recognizes that the direction of the face of the user moves out of the display region of the display unit. For example, as illustrated in FIG. 21B, the electronic device recognizes that the user does not see a webpage. Therefore, when the electronic device determines that the face direction is greater than or equal to the reference range, the electronic device proceeds to operation 2013 at which the electronic device verifies whether a driving time of a timer expires. According to various embodiments of the present disclosure, the timer, for verifying a time point when controlling the display unit to dim out the display unit, is reset whenever input information is detected.

When the electronic device determines that the driving time of the timer does not expire at operation 2013, the electronic device proceeds to operation 2007 at which the electronic device detects face motion of the user using a face image of the user, which is captured through the camera at operation 2005.

In contrast, when the electronic device determines that the driving time of the timer expires at operation 2013, the electronic device proceeds to operation 2015 at which the electronic device controls the display unit to dim out the display unit.

According to various embodiments of the present disclosure, the electronic device may inactivate a screen inactivation mode when the face direction of the user is located within the reference range.

According to various embodiments of the present disclosure, when a plurality of faces is recognized, the electronic device may control a screen inactivation mode based on a direction of a reference face among the plurality of faces.

As described above, according to various embodiments of the present disclosure, as the electronic device provides the control service according to face motion information, the user of the electronic device may control the electronic device freely in a state in which the electronic device may not recognize motion of pupils or in which the user has medical problems.

It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   executing an application;
   extracting control information corresponding to a type of the executed application from a non-transitory memory of the electronic device;
   capturing at least one image from at least one camera of the electronic device, the at least one image including a partial image of at least one target object;
   estimating an entire image by comparing the partial image of the at least one target object with another image of the at least one target object stored in the non-transitory memory;
   determining one of the extracted control information based on the estimated entire image of the at least one target object; and
   controlling the application corresponding to the determined control information;
   determining whether the at least one target object moves out of a reference range, the determination based on a face motion angle of the at least one target object,
   wherein the controlling of the application comprises:
       pausing video play when the at least one target object moves out of a reference range, or
       maintaining video play when the at least one target object does not move out of a reference range,
   wherein, when the at least one target object moves out of the reference range, the extracted control information is a pause control information, and
   wherein, when the at least one target object does not move out of the reference range, the extracted control information is a control information for maintaining a screen state.

2. The method of claim 1,
   wherein the at least one target object includes at least one of a face motion distance, a face direction, a face motion speed, and a face motion time, and
   wherein the control information is stored in the memory and corresponds to at least one of a type of an application, face motion information, and a reference range.

3. The method of claim 1, further comprising:
   determining at least one reference face among a plurality of faces when the plurality of faces is detected on the at least one image captured through the camera; and
   detecting motion of the at least one reference face.

4. The method of claim 1, wherein the controlling of the application comprises:
   pausing video play in response to a face angle change when a face motion angle moves out of a reference range while a video is reproduced.

5. The method of claim 1, wherein the controlling of the application comprises:
   pausing video play in response to a face angle change when a face motion angle moves out of a reference range during a reference time while a video is reproduced.

6. The method of claim 1, wherein the controlling of the application comprises:
   scrolling a screen in response to a position change direction of eyes from the image when positions of the eyes according to the at least one target object move out of a reference point.

7. The method of claim 6, wherein the scrolling of the screen comprises:
   determining a screen scroll direction based on the position change direction of the eyes;
   determining a scroll speed based on at least one of a face motion speed and a face motion angle; and
   scrolling the screen based on the screen scroll direction and the scroll speed.

8. The method of claim 1, wherein the controlling of the application comprises:
   determining whether to receive a call based on a call receiving method corresponding to a face motion direction when receiving the call,
   wherein the call receiving method includes at least one of call receiving acceptance, voice mail box connection, and call receiving rejection.

9. The method of claim 1, wherein the controlling of the application comprises:
   verifying positions of eyes from the at least one image based on the at least one target object when e-book contents are displayed; and
   changing pages when the eyes gaze at a first region.

10. The method of claim 1, wherein the controlling of the application comprises:
    changing pages based on a face motion direction when e-book contents are displayed.

11. An electronic device comprising:
    at least one camera;
    a display;
    a non-transitory memory; and
    at least one processor,
    wherein the at least one processor is configured to:
        execute an application,
        extract control information corresponding to a type of the executed application from the memory,
        capture at least one image from the at least one camera, the at least one image including a partial image of at least one target object,
        estimate an entire image by comparing the partial image of the at least one target object with another image of the at least one target object stored in the non-transitory memory, determine one of the extracted control information based on the estimated entire image of the at least one target object, and control the application corresponding to the determined control information;

determine whether the at least one target object moves out of a reference range, the determination based on a face motion angle of the at least one target object, pause video play when the at least one target object moves out of a reference range, or maintain video play when the at least one target object does not move out of a reference range, wherein, when the at least one target object moves out of the reference range, the extracted control information is a pause control information, and wherein, when the at least one target object does not move out of the reference range, the extracted control information is a control information for maintaining a screen state.

12. The electronic device of claim 11, wherein the at least one target object includes at least one of a face motion distance, a face direction, a face motion speed, and a face motion time, and wherein the control information is stored in the memory and corresponds to at least one of a type of an application, face motion information, and a reference range.

13. The electronic device of claim 11, wherein the at least one processor is further configured to:

determine at least one reference face among a plurality of faces when the plurality of faces is detected on the at least one image captured through at least the one camera, and detect motion of the at least one reference face.

14. The electronic device of claim 11, wherein the at least one processor is further configured to pause video play in response to a face angle change when a face motion angle moves out of a reference range while a video is reproduced.

15. The electronic device of claim 11, wherein the at least one processor is further configured to pause video play in response to a face angle change when a face motion angle moves out of a reference range during a reference time while a video is reproduced.

16. The electronic device of claim 11, wherein the at least one processor is further configured to scroll a screen in response to a position change direction of eyes from the image when positions of the eyes according to the at least one target object move out of a reference point.

17. The electronic device of claim 16, wherein the at least one processor is further configured to:

determine a screen scroll direction based on the position change direction of the eyes, determine a scroll speed based on at least one of a face motion speed and a face motion angle, and scroll the screen based on the screen scroll direction and the scroll speed.

18. The electronic device of claim 11, wherein the at least one processor is further configured to determine whether to receive a call based on a call receiving method corresponding to a face motion direction when receiving the call, and wherein the call receiving method includes at least one of call receiving acceptance, voice mail box connection, and call receiving rejection.

19. The electronic device of claim 11, wherein the at least one processor is further configured to:

verify positions of eyes based on the at least one target object when e-book contents are displayed, and change pages when the eyes gaze at a first region.

20. The electronic device of claim 11, wherein the at least one processor is further configured to change pages based on a face motion direction when e-book contents are displayed.

* * * * *